(12) United States Patent
Baxter, Jr.

(10) Patent No.: US 11,214,637 B2
(45) Date of Patent: *Jan. 4, 2022

(54) PROCESSES FOR MAKING POLYISOBUTYLENE COMPOSITIONS

(71) Applicant: NTP Tec, LLC, Boerne, TX (US)

(72) Inventor: Clyde Edward Baxter, Jr., League City, TX (US)

(73) Assignee: NTP TEC, LLC, Boerne, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/808,057

(22) Filed: Mar. 3, 2020

(65) Prior Publication Data

US 2020/0199271 A1 Jun. 25, 2020

Related U.S. Application Data

(63) Continuation of application No. 16/090,092, filed on Sep. 28, 2018, now Pat. No. 10,640,590, which is a continuation of application No. PCT/US2018/018808, filed on Feb. 20, 2018.

(60) Provisional application No. 62/606,023, filed on Sep. 6, 2017, provisional application No. 62/600,388, filed on Feb. 21, 2017.

(51) Int. Cl.
| | |
|---|---|
| *C08F 110/02* | (2006.01) |
| *C08F 4/14* | (2006.01) |
| *B01J 31/14* | (2006.01) |
| *C08F 110/10* | (2006.01) |
| *C08F 4/02* | (2006.01) |
| *B01J 27/12* | (2006.01) |
| *B01J 20/32* | (2006.01) |

(52) U.S. Cl.
CPC ......... *C08F 110/10* (2013.01); *B01J 20/3208* (2013.01); *B01J 27/12* (2013.01); *B01J 31/146* (2013.01); *C08F 4/02* (2013.01); *C08F 4/14* (2013.01)

(58) Field of Classification Search
CPC ...... B01J 27/12; B01J 31/146; B01J 20/3208; C08F 4/14; C08F 110/10
See application file for complete search history.

(56) References Cited

U.S. PATENT DOCUMENTS

| | | | |
|---|---|---|---|
| 1,885,060 A | 10/1932 | Hoffmann et al. |
| 2,404,788 A | 7/1946 | Burk et al. |
| 2,484,384 A | 10/1949 | Levine et al. |
| 2,677,002 A | 4/1954 | Yahnke et al. |
| 2,766,312 A | 10/1956 | Semiuk et al. |
| 2,804,491 A | 8/1957 | May et al. |
| 2,957,930 A | 10/1960 | Jackson et al. |
| 2,976,338 A | 3/1961 | Thomas |
| 3,068,301 A | 12/1962 | Hervert et al. |
| 3,114,785 A | 12/1963 | Hervert et al. |
| 3,119,884 A | 1/1964 | Mien et al. |
| 3,131,156 A | 4/1964 | Wilson, Jr. et al. |
| 4,152,499 A | 5/1979 | Boerzel et al. |
| 4,256,913 A | 3/1981 | Jung et al. |
| 4,306,105 A | 12/1981 | Abernathy et al. |
| 4,400,565 A | 8/1983 | Darden et al. |
| 4,407,731 A | 10/1983 | Imai |
| 4,427,791 A | 1/1984 | Miale et al. |
| 4,429,177 A | 1/1984 | Morganson et al. |
| 4,533,651 A | 8/1985 | Masters et al. |
| 4,605,808 A | 8/1986 | Samson |
| 4,918,255 A | 4/1990 | Chou et al. |
| 4,935,577 A | 6/1990 | Huss, Jr. et al. |
| 5,068,487 A | 11/1991 | Theriot |
| 5,068,490 A | 11/1991 | Eaton |
| 5,191,044 A | 3/1993 | Rath et al. |

(Continued)

FOREIGN PATENT DOCUMENTS

| | | |
|---|---|---|
| CA | 2866897 A1 | 12/2013 |
| WO | 9402243 A1 | 2/1994 |

(Continued)

OTHER PUBLICATIONS

WO 2016/047445 (Mar. 31, 2016); Okazaki, Motoya et al.; machine translation. (Year: 2016).*
Extended European Search Report dated Jan. 28, 2021 for Application No. 18758114.5.
Canadian Office Action for Application No. CA 3,053,389 dated Sep. 9, 2020.
Ndian Office Action for Application No. IN 201947036946 dated Oct. 14, 2020.
Wilson, Karen et al., "Synthesis of a Supported Solid Acid BF3 Catalyst", J. of Chem. Soc., Chem. Commun., 1998, pp. 2135-2136.
International Search Report and Written Opinion dated May 24, 2018 for Application No. PCT/US2018/018808.
Indian Examination Report dated May 20, 2021 for Application No. 202148004624.
Malaysia Office Action dated Sep. 29, 2021 for Application No. PI2019004684.

*Primary Examiner* — Rip A Lee
(74) *Attorney, Agent, or Firm* — Patterson + Sheridan, LLP

(57) ABSTRACT

Methods of making polyisobutylene and catalyst systems are described. Polyisobutylene compositions and catalyst system compositions are also described. In some embodiments, a method of making a catalyst system includes: providing a support material; calcining the support material; and forming a catalyst system by adding to the support material (a) a mixture comprising $BF_3$, (b) a mixture comprising $BF_3$ and a complexing agent, or (c) both. In some embodiments, a method of making a polymer composition includes providing a catalyst system comprising: (a) a support material selected from the group consisting of $Al_2O_3$, $ZrO_2$, $TiO_2$, $SnO_2$, $CeO_2$, $SiO_2$, $SiO_2/Al_2O_3$, and combinations thereof; and (b) $BF_3$; providing a feedstock comprising isobutylene; forming a reaction mixture comprising the feedstock and the catalyst system; contacting the isobutylene with the catalyst system; and obtaining a polymer composition.

17 Claims, 3 Drawing Sheets

(56) References Cited

U.S. PATENT DOCUMENTS

| | | |
|---|---|---|
| 5,268,520 A | 12/1993 | Karn et al. |
| 5,286,823 A | 2/1994 | Rath |
| 5,294,578 A | 3/1994 | Ho et al. |
| 5,326,920 A | 7/1994 | Ho et al. |
| 5,326,923 A | 7/1994 | Cooper et al. |
| 5,408,018 A | 4/1995 | Rath |
| 5,646,332 A | 7/1997 | Cusumano et al. |
| 5,663,470 A | 9/1997 | Chen et al. |
| 5,710,225 A | 1/1998 | Johnson et al. |
| 5,770,539 A | 6/1998 | Chen et al. |
| 5,789,335 A | 8/1998 | Chen et al. |
| 5,910,550 A | 6/1999 | Rath |
| 5,945,575 A | 8/1999 | Sigwart et al. |
| 5,962,604 A | 10/1999 | Rath |
| 6,384,154 B1 | 5/2002 | Sigwart et al. |
| 6,433,238 B1 | 8/2002 | Di Girolamo et al. |
| 6,441,110 B1 | 8/2002 | Sigwart et al. |
| 6,525,149 B1 | 2/2003 | Baxter, Jr. et al. |
| 6,562,913 B1 | 5/2003 | Baxter, Jr. et al. |
| 6,683,138 B2 | 1/2004 | Baxter, Jr. et al. |
| 6,710,140 B2 | 3/2004 | Wettling et al. |
| 6,867,267 B2 | 3/2005 | Lewtas et al. |
| 6,884,858 B2 | 4/2005 | Baxter, Jr. et al. |
| 6,992,152 B2 | 1/2006 | Lobue |
| 7,411,104 B2 | 8/2008 | Yun et al. |
| 8,791,216 B2 | 7/2014 | Baxter, Jr. |
| 8,816,028 B2 | 8/2014 | Baxter, Jr. |
| 9,040,645 B2 * | 5/2015 | Baxter, Jr. ............ C08F 110/10 526/212 |
| 2012/0238716 A1 | 9/2012 | Baxter, Jr. |
| 2013/0317189 A1 | 11/2013 | Baxter, Jr. |

FOREIGN PATENT DOCUMENTS

| | | | |
|---|---|---|---|
| WO | 9526818 A1 | 10/1995 | |
| WO | 2000013792 A1 | 3/2000 | |
| WO | WO 00/13792 A1 * | 3/2000 | .............. B01J 27/12 |
| WO | 2016047445 A1 | 3/2016 | |
| WO | WO 2016/047445 A1 * | 3/2016 | .............. C08F 10/10 |

* cited by examiner

PROCESSES FOR MAKING POLYISOBUTYLENE COMPOSITIONS

CROSS REFERENCE TO RELATED APPLICATIONS

This application is a continuation of U.S. patent application Ser. No. 16/090,092, now U.S. Pat. No. 10,640,590, filed Sep. 28, 2018, which is a continuation International Application No. PCT/US2018/018808, filed Feb. 20, 2018, which claims benefit of U.S. Provisional Patent Application No. 62/600,388, filed Feb. 21, 2017 and to U.S. Provisional Patent Application No. 62/606,023, filed Sep. 6, 2017, each of which is incorporated by reference herein in its entirety.

This application is related to another co-pending U.S. application, filed on even date herewith, and identified by the following Attorney Docket Number and title: Ser. No. 16/808,072 entitled "Processes for Making Polyisobutylene Compositions", which is incorporated by reference herein in its entirety.

FIELD

The present disclosure relates to highly-reactive polyisobutylene (HR-PIB) compositions. The present disclosure also relates to catalyst systems and methods for forming HR-PIB compositions.

BACKGROUND

Common methods to polymerize isobutylene and form polyisobutylene (PIB) with one carbon-carbon double bond include using Lewis acid catalysts, such as boron trifluoride ($BF_3$) and aluminum trichloride ($AlCl_3$). The double bond can be located at the end of the polymer chain (e.g., alpha vinylidenes) or it can be located more internal in the chain as in beta vinylidene or other trisubstituted olefin isomers, or tetra substituted olefin isomers. PIB containing a high proportion of alpha vinylidene olefin isomers is referred to as highly reactive polyisobutylene (HR-PIB). Such polymer molecules are more reactive in subsequent derivatization reactions to produce derivatives such as fuel and lubricant additives than other types of PIB.

Conventional $AlCl_3$ catalysts typically produce PIB that has olefin isomers other than alpha vinylidene. These PIB products are known as conventional PIB and are significantly less reactive in derivatization reactions.

Catalyst complexes (such as liquid $BF_3$/complexing agent) have been developed to produce HR-PIB. See U.S. Pat. Nos. 6,525,149; 6,562,913; 6,683,138; and 6,884,858. However, many liquid $BF_3$/complexing agents are unstable and must be prepared in situ, requiring the handling of highly toxic $BF_3$ gas on site. The liquid $BF_3$/complexing agents must also be removed post-reaction by extensive water washing processes which are highly complex and generate large amounts of waste water. Moreover, the waste water contains fluoride salts that require disposal.

U.S. Pat. Nos. 8,791,216 and 8,816,028 describe polyisobutylene compositions, and methods and catalyst systems to produce such compositions. The catalyst system is a solid $BF_3$/alcohol catalyst complex on a metal oxide support material of gamma alumina beads or spheres, and the catalyst system is used in a fixed bed reactor. The PIB products made include internal vinylidene isomers and alpha vinylidene isomers, such that the alpha vinylidene olefin isomers in these compositions are significantly less than 75 wt %.

U.S. Pat. No. 9,040,645 discloses a method of preparing alumina with pores and reacting $BF_3$/methanol complexes with the porous alumina. The $BF_3$/methanol/alumina catalyst system produces PIB compositions in which the alpha vinylidene isomer content is significantly less than 75 wt %.

Other references that describe conventional PIB processes and catalysts include: U.S. Pat. Nos. 5,710,225; 5,945,575; 6,384,164; 6,441,110; 6,710,140; and 6,992,152.

There exists a need for an improved process to produce HR-PIB compositions having an alpha vinylidene olefin isomer content greater than about 75% and catalyst for producing such materials.

SUMMARY

In an embodiment, a method of making a catalyst system is provided. The method includes providing a support material selected from the group consisting of $Al_2O_3$, $ZrO_2$, $TiO_2$, $SnO_2$, $CeO_2$, $SiO_2$, $SiO_2/Al_2O_3$, and combinations thereof; calcining the support material at a temperature of about 450° C. to about 900° C.; and forming a catalyst system by adding to the support material (a) a mixture comprising $BF_3$, (b) a mixture comprising $BF_3$ and a complexing agent, or (c) both.

In at least one embodiment, a method of making a catalyst system is provided. The method includes providing a support material comprising one or more ion exchange resins; dehydrating the support material at a temperature of about 30° C. to about 200° C.; and forming a catalyst system by adding to the support material (a) a mixture comprising $BF_3$, (b) a mixture comprising $BF_3$ and a complexing agent, or (c) both.

In at least one embodiment, a method of making a catalyst system is provided. The method includes providing a support material selected from the group consisting of $Al_2O_3$, $ZrO_2$, $TiO_2$, $SnO_2$, $CeO_2$, $SiO_2$, $SiO_2/Al_2O_3$, and combinations thereof, the support material calcined at a temperature of about 450° C. to about 900° C.; and forming a catalyst system by adding to the support material (a) a mixture comprising $BF_3$, (b) a mixture comprising $BF_3$ and a complexing agent, or (c) both.

In at least one embodiment, a method of making a catalyst system is provided. The method includes providing a support material comprising one or more ion exchange resins, and combinations thereof, the support material dehydrated at a temperature of about 30° C. to about 200° C.; and forming a catalyst system by adding to the support material (a) a mixture comprising $BF_3$, (b) a mixture comprising $BF_3$ and a complexing agent, or (c) both.

In at least one embodiment, a catalyst system is provided. The catalyst system includes a support material selected from the group consisting of $Al_2O_3$, $ZrO_2$, $TiO_2$, $SnO_2$, $CeO_2$, $SiO_2$, $SiO_2/Al_2O_3$, and combinations thereof; and $BF_3$, wherein the concentration of $BF_3$ is greater than about 25 wt %, based on the total weight of the catalyst system.

In at least one embodiment, a catalyst system is provided. The catalyst system includes a support material comprising one or more ion exchange resins; and $BF_3$, wherein the concentration of $BF_3$ is greater than about 25 wt %, based on the total weight of the catalyst system.

In at least one embodiment, a method of making a polymer composition, is provided. The method includes providing a catalyst system comprising: (a) a support material selected from the group consisting of $Al_2O_3$, $ZrO_2$, $TiO_2$, $SnO_2$, $CeO_2$, $SiO_2$, $SiO_2/Al_2O_3$, and combinations thereof; and (b) $BF_3$; providing a feedstock comprising isobutylene; forming a reaction mixture comprising the feedstock and the catalyst system; contacting the isobutylene with the catalyst system; and obtaining a polymer composition.

In at least one embodiment, a method of making a polymer composition, is provided. The method includes providing a catalyst system comprising: (a) a support material comprising one or more ion exchange resins; and (b) $BF_3$; providing a feedstock comprising isobutylene; forming a reaction mixture comprising the feedstock and the catalyst system; contacting the isobutylene with the catalyst system; and obtaining a polymer composition.

BRIEF DESCRIPTION OF THE FIGURES

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, for the disclosure may admit to other equally effective embodiments.

DETAILED DESCRIPTION

Figure 1A:
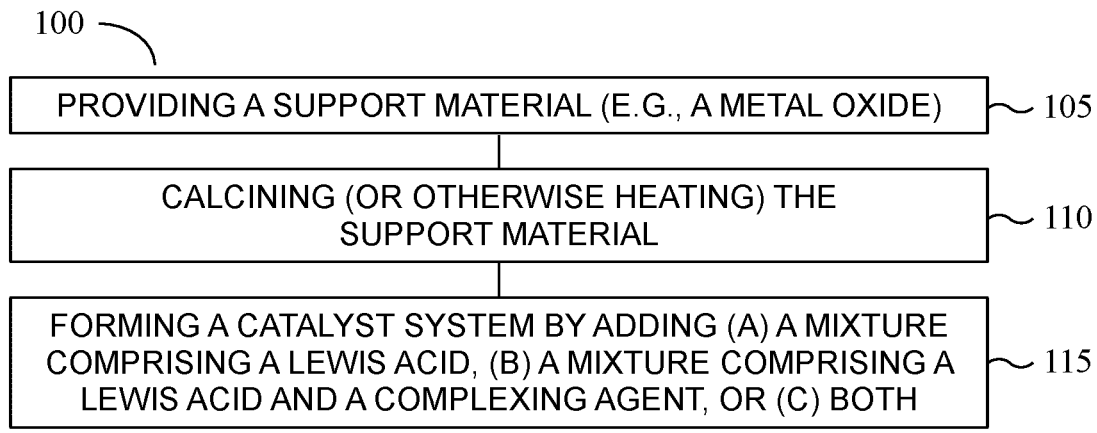
FIG. 1A shows a block diagram of a process to form a catalyst system according to some embodiments.

The present disclosure relates to catalyst compositions and processes to make polyisobutylenes (PIB), and particularly highly reactive polyisobutylene (HR-PIB). The present disclosure also relates to PIB compositions, particularly HR-PIB compositions.

For purposes of this disclosure, HR-PIB is a composition containing greater than about 75% alpha vinylidene olefin isomer. The HR-PIB compositions can contain additional olefin isomers including beta vinylidene olefin isomer, other trisubstituted olefin isomers, internal vinylidenes, and tetra-substituted olefin isomers. HR-PIB is termed highly reactive because of its increased reactivity in derivatization reactions, such as reactions with maleic anhydride to produce polyisobutenylsuccinic anhydride (PIBSA) to form precursors useful for fuel and lubricant additives.

For purposes of this application, molecular structures may be represented by bond-line structure (also known as skeletal structure) in which the position of carbon and hydrogen atoms may be implied.

For purposes of this application, an alpha vinylidene olefin isomer (also referred to as α-vinylidene) has the following structure:

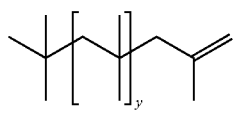

For purposes of this application, a beta vinylidene olefin isomer (also referred to as β-vinylidene) has the following structure:

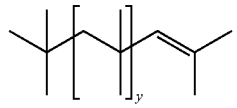

For purposes of this application, an internal disubstituted vinylidene olefin isomer includes the following structure:

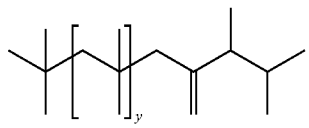

Other internal vinylidenes are possible, including where the position of the olefin in the polyisobutylene is such that the olefin is disubstituted and not at the end of the carbon chain. For purposes of this application other trisubstituted olefin isomers and tetrasubstituted olefin isomers may be produced in the polymerizations described herein.

As used herein, an "olefin," alternatively referred to as "alkene," is a linear, branched, or cyclic compound of carbon and hydrogen having at least one carbon-carbon double bond. For purposes of this specification and the claims appended thereto, when a polymer or copolymer is referred to as comprising an olefin, the polymer or copolymer has polymer molecules that have at least one olefin bond.

A "polymer" has two or more of the same or different monomer ("mer") units bonded together in a single polymer molecule, or a collection of such polymer molecules. A "homopolymer" is a polymer having mer units that are the same. A "copolymer" is a polymer having two or more mer units that are different from each other. "Different" as used to refer to mer units indicates that the mer units differ from each other by at least one atom or are different isomerically.

As used herein, Mn is number average molecular weight, Mw is weight average molecular weight, wt % is weight percent, and mol % is mole percent. Unless otherwise noted, all molecular weight units (e.g., Mw and Mn) are daltons (Da).

As used herein, a "catalyst" includes a single catalyst, or multiple catalysts with each catalyst being conformational isomers or configurational isomers. Conformational isomers include, for example, conformers and rotamers. Configurational isomers include, for example, stereoisomers.

The term "catalyst complex" refers to a complex of a catalyst and a complexing agent. Catalyst complex includes a single catalyst complex or multiple catalyst complexes.

The term "catalyst system" refers to a composition comprising a catalyst and a support material. Catalyst system also refers to a composition comprising a catalyst complex with a support material. When catalyst systems are described (including by structure or formula) as comprising neutral stable forms of the components, it is well understood by one of ordinary skill in the art, that the form that reacts with the polymer precursors to produce polymers may be a reactive form that results directly from proper use of the catalyst system.

Furthermore, catalysts of the present disclosure (which may be represented by a formula and/or a structure) are intended to embrace ionic, reactive, or reaction product forms of the catalysts in addition to the neutral forms of the catalysts. Furthermore, complexing agents of the present disclosure (which may be represented by a formula and/or a structure) are intended to embrace ionic, reactive, or reaction product forms of the complexing agents in addition to neutral forms of the complexing agents. Moreover, catalyst systems of the present disclosure (which may be represented by a formula and/or a structure) are intended to embrace ionic, reactive, or reaction product forms of the catalyst systems in addition to neutral forms of the catalyst systems.

As used herein, composition includes components of the composition and/or reaction products thereof.

A catalyst system, when made, sold, or used includes about 25% to about 45% of $BF_3$.

Unless otherwise indicated, the term "substituted" generally refers to a hydrogen of the substituted species being (or has been) replaced with a different atom or group of atoms.

The following abbreviations may be used herein: Me is methyl; Et is ethyl; Pr is propyl; nPr is normal propyl; iPr is isopropyl; Bu is butyl; nBu is normal butyl; iBu is isobutyl; sBu is sec-butyl; tBu is tert-butyl; THF (also referred to as thf) is tetrahydrofuran; MeOH is methanol; MTBE (also referred to as mtbe) is methyl tert-butyl ether; RT is room temperature (and is between about 15° C. and about 25° C. unless otherwise indicated).

The terms "hydrocarbyl radical," "hydrocarbyl," "hydrocarbyl group," "alkyl radical," "alkyl," and "alkyl group" may be used herein, and if used, are used interchangeably. Likewise, the terms "group," "radical," and "substituent" are also used interchangeably in this document, referring only to chemical groups that are attached to other chemical structures, implying nothing about the state, structure, charge, or condition of such groups when not attached to other chemical structures. For purposes of this disclosure, "hydrocarbyl radical" refers to $C_1$-$C_{100}$ radicals, that may be linear, branched, or cyclic, and when cyclic, aromatic or non-aromatic. Examples of such radicals include methyl, ethyl, n-propyl, isopropyl, n-butyl, isobutyl, sec-butyl, tert-butyl, pentyl, iso-amyl, hexyl, octyl, cyclopropyl, cyclobutyl, cyclopentyl, cyclohexyl, cyclooctyl, benzyl, and their substituted analogues. Substituted hydrocarbyl radicals are radicals in which at least one hydrogen atom of the hydrocarbyl radical has been substituted with at least one halogen (such as Br, Cl, F or I) or at least one functional group such as $C(O)R^*$, $C(O)NR^*_2$, $C(O)OR^*$, $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, and $PbR^*_3$ (where $R^*$ is independently a hydrogen or hydrocarbyl radical, and two or more $R^*$ may join together to form a substituted or unsubstituted saturated, partially unsaturated or aromatic cyclic or polycyclic ring structure), or where at least one heteroatom has been inserted within a hydrocarbyl ring.

The term "alkenyl" may be used herein, and if used, refers to a straight-chain, branched-chain, or cyclic hydrocarbon radical having one or more double bonds. These alkenyl radicals may be optionally substituted.

The term "aryl" or "aryl group" may be used herein, and if used, includes a $C_4$-$C_{20}$ aromatic ring, such as a six carbon aromatic ring, and the substituted variants thereof, including phenyl, 2-methyl-phenyl, xylyl, 4-bromo-xylyl. Likewise heteroaryl refers to an aryl group where a ring carbon atom (or two or three ring carbon atoms) has been replaced with a heteroatom, for example, N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

The term "Ring structure" may be used herein, and if used, refers to atoms bonded together in one or more cyclic arrangements.

The term "ring atom" may be used herein, and if used, refers to an atom that is part of a cyclic ring structure. By this definition, a benzyl group has six ring atoms and tetrahydrofuran has 5 ring atoms.

The term "heterocyclic ring" may be used herein, and if used, refers to a ring having a heteroatom in the ring structure as opposed to a heteroatom-substituted ring where a hydrogen on a ring atom is replaced with a heteroatom. For example, tetrahydrofuran is a heterocyclic ring and 4-N,N-dimethylamino-phenyl is a heteroatom-substituted ring.

As used herein, the term "aromatic" also refers to pseudo-aromatic heterocycles which are heterocyclic structures that have similar properties and structures (nearly planar) to aromatic heterocyclic ligands, but are not by definition aromatic; likewise, the term aromatic also refers to substituted aromatics.

The term "continuous" refers to a system that operates without interruption or cessation while performing a particular process for which the system is designed. For example, a continuous process to produce a polymer would be one where the reactants are continually introduced into one or more reactors and polymer product is continually withdrawn during a polymerization process.

A solution polymerization refers to a polymerization process in which the polymer is dissolved in a liquid polymerization medium, such as an unreactive solvent or polymerizable compounds (including polymer precursors) or their blends.

A bulk polymerization refers to a polymerization process in which the precursors being polymerized are used as a solvent or diluent using little or no unreactive solvent as a solvent or diluent. A small fraction of unreactive solvent might be used as a carrier for a catalyst system. A bulk polymerization system contains less than about 25 wt % of unreactive solvent or diluent, for example, less than about 10 wt %, less than about 1 wt %, or about 0 wt %.

As used herein the term "slurry polymerization process" refers to a polymerization process where a supported catalyst is employed and polymer precursors are polymerized on the supported catalyst particles.

"Homopolymerization" would produce a polymer made from one type of polymerizable compounds (including polymer precursors), whereas "copolymerization" would produce polymers with more than one polymerizable compound type.

Catalyst Complexes

Catalysts for the polymerization processes described herein include Lewis acids, such as $BF_3$. The catalysts described herein are capable of forming polyisobutylenes (PIB) and particularly HR-PIBs.

The catalyst complexes described herein, like the Lewis acid catalysts, are capable of forming PIB and particularly HR-PIBs. Some of the disclosed catalyst complexes include a Lewis acid (for example, $BF_3$) and a complexing agent.

In some embodiments, the Lewis acid catalyst is complexed with a complexing agent. Alternately, the Lewis acid catalyst can be used without a complexing agent. The catalyst systems described herein are solids, for example powders. The solid catalyst systems described herein are formed by contacting the Lewis acid catalyst alone (e.g., $BF_3$ gas) with a support material, or by complexing the Lewis acid catalyst complex (e.g., $BF_3$/complexing agent) with a support material.

Complexing agents include linear, branched, cyclic, heterocyclic (for example, tetrahydrofuran and tetrahydropyran), aryl (such as phenol and benzyl alcohol), and heteroaryl compounds.

In some embodiments, the complexing agent is a compound that has a lone pair of electrons (such as oxygen containing compounds and nitrogen containing compounds). Nitrogen containing compounds include amines, polyamines (such as ethylene diamine), amides, polyamides, amino acids, polyamino acids, and polyaminocarboxylic acids such as ethylenediamine tetracetic acid (EDTA). In some embodiments, the nitrogen containing compound is an unsubstituted $C_1$ to $C_{20}$ amine (such as alkylamines, including methyl amine, ethyl amine, propyl amine, decyl amine and lauryl amine), a substituted $C_1$ to $C_{20}$ amine, including alkanol amines (such as ethanol amine, diethanol amine, triethanol amine, propanol amine, diethylethanol amine), an unsubstituted $C_2$ to $C_{20}$ polyamine (such as diethylenetriamine, triethylenetetramine, tetraethylenepentamine, and heavy polyamine X (HPA X)), a substituted $C_2$ to $C_{20}$ polyamine, an unsubstituted $C_1$ to $C_{20}$ amide (such as formamide, acetamide, 2-propenamide, and benzamide), a substituted $C_1$ to $C_{20}$ amide (such as N,N-dimethylformamide (DMF), N,N-dimethypropanamide, N-methylacetamide, and N-phenylacetamide), aliphatic polyamides (such as Nylon 6 and Nylon 66), polyphthalamides (such as hexamethylenediamine terepthalate), aramids (such as Kevlar and Nomex), an amino acid (such as the 20 standard amino acids, for example aspartic acid and glycine), a polyamino acid (such as poly(hydroxypropyl-L-glutamine) and poly-L-leucine), polyaminocarboxylic acids.

Oxygen containing compounds (also known as oxygenates) that may be used include alcohols, ethers, ketones, aldehydes, and carboxylic acids. In some cases, the complexing agent is an oxygen containing compound such as an alcohol or an ether (symmetrical or asymmetrical). In other cases, the complexing agent is a $C_1$ to $C_{10}$ unsubstituted alcohol, a $C_1$ to $C_{10}$ substituted alcohol, a $C_2$ to $C_{20}$ unsubstituted ether, or a $C_2$ to $C_{20}$ substituted ether.

In some cases, the complexing agent is an alcohol that lacks a beta hydrogen such as methanol, 2,2-dimethyl alcohols (for example, neopentyl alcohol, 2,2-dimethylbutanol, 2,2-dimethylpentanol, and 2,2-dimethylhexanol), benzyl alcohol, and ring-substituted benzyl alcohols.

In some embodiments, the complexing agent contains more than one oxygen containing group per molecule, for example, glycols (substituted or unsubstituted) and polyols (substituted or unsubstituted), for example wherein each hydroxyl is in a primary position, or for example, a $C_1$ to $C_{10}$ glycol (substituted or unsubstituted) such as ethylene glycol, 1,4-butanediol, trimethylolethane (2-(hydroxymethyl)-2-methylpropane-1,3-diol; $C_5H_{12}O_3$), trimethylolpropane (2-(hydroxymethyl)-2-ethylpropane-1,3-diol; $C_6H_{14}O_3$), pentaerythritol (2,2-bis(hydroxymethyl)propane-1,3-diol; $C_5H_{12}O_4$), and tris(hydroxymethyl)aminomethane ($C_4H_{11}NO_3$).

In one embodiment, the complexing agent is methanol, ethanol, isopropanol (also known as isopropyl alcohol), n-propanol (also known as propan-1-ol), neopentyl alcohol (also known as 2,2-dimethyl-1-propanol and neopentanol), dimethyl ether, diethyl ether, diisopropyl ether, diisobutyl ether, di-tert-butyl ether, methyl tert-butyl ether (MTBE), or ethylene glycol. In some cases, the oxygen containing compound is methanol.

In some embodiments, the catalyst complex (e.g., the $BF_3$/complexing agent) is formed by passing $BF_3$ gas through the pure anhydrous oxygen containing compound (or nitrogen containing compound) at a rate that allows the $BF_3$ to be efficiently absorbed.

In some embodiments, the mole ratio of complexing agent to $BF_3$ is between about 0.1 and about 10 in the catalyst complex. In other embodiments, the mole ratio is between about 0.2 and about 5. In some cases, the mole ratio is between about 0.2 and 2. In other cases, the mole ratio is between about 0.5 and about 2, for example between about 1.0 and about 1.9. In some embodiments, the mole ratio is between about 1.0 and about 1.3, for example, about 1.0.

Support Materials

The catalyst system comprises an unreactive support material. Suitable support materials for the catalyst and/or catalyst complex include any support material that forms a stable adduct with $BF_3$. In an embodiment, the support material is a porous support material, comprising inorganic oxides. Other suitable support materials are the metal oxides doped with rare earth metals or rare earth metals themselves or combinations of both.

In some embodiments, the support material is an inorganic oxide in a finely divided form, such as a powder. Suitable inorganic oxide materials for use in catalyst systems herein include metal oxides of Group IIIA, Group IVA, and Group IVB of the Periodic Table of the Elements, such as alumina, silica, and titania, and mixtures thereof. Inorganic oxides may be employed either alone or in combination with the silica or alumina including titania and zirconia. Combinations of the support materials may be used, for example, silica-alumina, and silica-titania. In some embodiments, support materials include $Al_2O_3$, $ZrO_2$, $TiO_2$, $SnO_2$, $CeO_2$, $SiO_2$, $SiO_2/Al_2O_3$, and combinations thereof. In some embodiments, support materials include $SiO_2$, $Al_2O_3$, $SiO_2/Al_2O_3$, or combinations thereof.

In some embodiments, the support material has one or more of the following properties:

1) at least about 1% $Al_2O_3$ by weight (for example, greater than about 3 wt %, such as greater than about 5 wt %, greater than about 10 wt %, greater than about 15 wt %, greater than about 20 wt %, greater than about 25 wt %, greater than about 30 wt %, greater than about 35 wt %, greater than about 40 wt %, greater than about 45 wt %, or greater than about 50 wt %), based on the total weight of the support material. Alternately, the support material has less than about 99 wt % $SiO_2$ (for example, less than about 97 wt %, such as less than about 95 wt %, less than about 90 wt %, less than about 85 wt %, less than about 80 wt %, less than about 75 wt %, less than about 70 wt %, less than about 65 wt %, less than about 60 wt %, less than about 55 wt %, or less than about 50 wt %), based on the total weight of the support material. Alternately, the support material has an $Al_2O_3$ of wt % ranges within those aforementioned weight percents.

2) at least about 1% $SiO_2$ by weight (for example, greater than about 3 wt %, such as greater than about 5 wt %, greater than about 10 wt %, greater than about 15 wt %, greater than about 20 wt %, greater than about 25 wt %, greater than about 30 wt %, greater than about 35 wt %, greater than about 40 wt %, greater than about 45 wt %, or greater than about 50 wt %), based on the total weight of the support material. Alternately, the support material has less than about 99 wt % $SiO_2$ (for example, less than about 97 wt %, such as less than about 95 wt %, less than about 90 wt %, less than about 85 wt %, less than about 80 wt %, less than about 75 wt %, less than about 70 wt %, less than about 65 wt %, less than about 60 wt %, less than about 55 wt %, or less than about 50 wt %), based on the total weight of the support material. Alternately, the support material has a $SiO_2$ content of wt % ranges within those aforementioned weight percents.

3) a surface area greater than about 10 $m^2/g$ (for example, between about 10 $m^2/g$ and about 700 $m^2/g$, such as between about 50 $m^2/g$ and about 500 $m^2/g$, or between about 100 $m^2/g$ and about 400 $m^2/g$). Alternately, the surface area is greater than about 150 $m^2/g$.

4) a pore volume greater than about 0.1 cc/g (for example, between about 0.1 cc/g and about 4.0 cc/g, such as between about 0.5 cc/g and about 3.5 cc/g, or between about 0.8 cc/g and about 3.0 cc/g).

5) a monodispersed particle size or a distribution of particle sizes with an average particle size greater than about 5 μm (for example, between about 5 μm and about 500 μm, such as between about 5 μm and about 200 μm, or between about 10 μm and about 100 μm).

6) an average pore size (diameter) greater than about 1 nm (for example, between about 1 nm and about 100 nm, such as between about 5 nm and about 50 nm, or between about 7.5 nm and about 35 nm). Alternately, the pore size is greater than about 20 nm.

7) a pore volume greater than about 0.3 cc/g (for example, greater than about 0.5 cc/g or greater than about 1.0 cc/g).

8) less than about 5 wt % $Fe_2O_3$ (for example, less than about 1 wt %, such as less than about 0.5 wt %, or less than about 0.2 wt %), based on the total weight of the support material.

9) less than about 5 wt % $Na_2O$ (for example, less than about 1 wt %, such as less than about 0.5 wt %, less than about 0.2 wt %, or less than about 0.02), based on the total weight of the support material.

In some embodiments, the support material is a high surface area, amorphous silica (for example, the surface area is about 300 $m^2/g$ and the pore volume is about 1.65 $cm^3/gm$).

Other support materials include the following: gamma-alumina spheres (γ-$Al_2O_3$); $SiO_2/Al_2O_3$ (silica-alumina) support material having about 50 wt % $SiO_2$; and a second $SiO_2/Al_2O_3$ (silica-alumina) support material having about 75 wt % $SiO_2$. Table 1 shows the physical properties of these support materials prior to heating, calcining, and complexing with the catalyst and/or catalyst complexes.

TABLE 1

Physical Properties of Example Support Materials

| Property | Gamma-Alumina Spheres | Silica-Alumina | Silica-Alumina |
|---|---|---|---|
| Attorney Docket No. NWTC/0002USPC01; Inventor: C. Edward Baxter, Jr. Title: Processes for Making Polyisobutylene Compositions | | | |
| $Al_2O_3$ (wt %) | 92.7 | 50.85 | 25.63 |
| Loss on Ignition (1000° C. for 1 h) (wt %) | 7.0 | 0.19 | 0.02 |
| $SiO_2$ (wt %) | 0.02 | 49.15 | 74.37 |
| $Fe_2O_3$ (wt %) | 0.02 | — | — |
| $Na_2O$ (wt %) | 0.2 | 0.01 | 0.01 |
| Sphere diameter (mm) | 3.2 | — | — |
| Particle Size: D10 (μm) | — | 12.25 | 11.13 |
| Particle Size: D50 (μm) | — | 39.05 | 38.63 |
| Particle Size: D90 (μm) | — | 79.01 | 79.53 |
| Packed Bulk Density (g/cm³) | 0.769 | — | — |
| Loose Bulk Density (g/cm³) | — | 0.38 | 0.28 |
| Surface Area (m²/g) | 350 | 163.9 | 172.28 |

TABLE 1-continued

Physical Properties of Example Support Materials

| Property | Gamma-Alumina Spheres | Silica-Alumina | Silica-Alumina |
|---|---|---|---|
| Pore Volume (cc/g) | 0.50 | 1.06 | 1.45 |
| Pore Diameter (nm) | — | 25.79 | 33.48 |

The support material should be dry, that is, free (or essentially free) of absorbed water before addition of the catalyst or the catalyst complex. Drying of the support material can be effected by heating or calcining at a temperature of at least about 25° C. (for example, between about 100° C. and about 1000° C., such as between about 200° C. and 1000° C., between about 250° C. and 1000° C., between about 400° C. and about 900° C., or between about 550° C. and about 700° C.); and for a time of between about 1 minute and about 100 hours (for example, between about 1 minute and about 72 hours, such as between about 1 minute and about 60 hours, or between about 2 hours and about 10 hours, such as about 2 hours, about 4 hours, 6 hours, or about 8 hour).

In some embodiments, the support material is calcined when first manufactured and/or recalcined as received. The calcined support material is then contacted with at least one of a mixture comprising $BF_3$ and a mixture comprising $BF_3$ and complexing agent.

Other support materials that can be used include organic supports that are a solid or that forms a solid when complexed with $BF_3$ and/or $BF_3$ and complexing agent. This organic support and can be used instead of, or in combination with the inorganic oxide support material. While not wishing to be bound by theory, it is believed that the organic support, like an inorganic oxide support, provides active sites for the $BF_3$ and/or $BF_3$ and complexing agent. In some embodiments, this support can be any solid organic complexing agent containing O or N functionality (or any functionality) that is capable of supporting $BF_3$ or $BF_3$ complexes. Alternately, the support can be an organic complexing agent containing O or N functionality (or any functionality) that forms a solid when complexed $BF_3$ or $BF_3$ complexes. Examples of such complexing agents that act as supports include ion exchange resins such as anionic exchange resins and cationic exchanges resins, including strongly acidic cation exchange resins, weakly acidic cation exchange resins, strongly basic anionic exchange resins, and weakly basic anionic exchange resins. For example, Amberlyst™ and Amberlite™ resins (such as Amberlyst 15 sulfonic acid and Amberlite IRA 67 weak base (amine) resin) may be used as the support. The ion exchange resins may be used with or without calcining (or otherwise pretreated or heated). Dehydration (or otherwise heating) temperatures of the ion exchange resins include temperatures greater than about 25° C. (such as between about 30° C. and about 200° C., for example between about 100° C. and about 200° C., such as about 150° C.); and for a time of between about 1 minute and about 100 hours (for example, between about 1 minute and about 72 hours, such as between about 1 minute and about 60 hours, or between about 2 hours and about 10 hours, such as about 2 hours, about 4 hours, 6 hours, or about 8 hours).

Catalyst Systems

Some embodiments described herein are catalyst systems. A catalyst system can be made from any catalyst described herein, any support material described herein, any complexing agent described herein, and/or any catalyst complex described herein.

In some embodiments, a catalyst system includes $BF_3$ and a support material selected from the group consisting of $Al_2O_3$, $ZrO_2$, $TiO_2$, $SnO_2$, $CeO_2$, $SiO_2$, $SiO_2/Al_2O_3$, and combinations thereof, wherein the concentration of $BF_3$ is greater than about 1% by weight (for example, greater than about 5 wt %, such as greater than about 10 wt %, greater than about 20 wt %, greater than about 25 wt %, greater than about 30 wt %, greater than about 40 wt %, or greater than about 50 wt %), based on the total weight of the catalyst system (i.e., $BF_3$ plus the support material).

In other embodiments, a catalyst system includes $BF_3$ and an organic support material that is an ion exchange resin (i.e., an anionic exchange resin, a cationic exchanges resins (such as Amberlyst™ and Amberlite™ resins), and/or combinations thereof), wherein the concentration of $BF_3$ is greater than about 1% by weight (for example, greater than about 5 wt %, such as greater than about 10 wt %, greater than about 20 wt %, greater than about 25 wt %, greater than about 30 wt %, such as about 40 wt %), based on the total weight of the catalyst system (i.e., $BF_3$ plus the support material).

In still other embodiments, a catalyst system includes a combination of inorganic oxide (i.e., $Al_2O_3$, $ZrO_2$, $TiO_2$, $SnO_2$, $CeO_2$, $SiO_2$, $SiO_2/Al_2O_3$, and combinations thereof) and organic support (i.e., ion exchange resins, such as anionic and cationic exchange resins for example Amberlyst™ and Amberlite™ resins)

The catalyst system can further include a complexing agent, wherein the concentration of $BF_3$ is greater than about 1% by weight (for example, greater than about 5 wt %, such as greater than about 10 wt %, greater than about 20 wt %, greater than about 25 wt %, greater than about 30 wt %, greater than about 40 wt %, or greater than about 50 wt %), based on the total weight of the catalyst system (i.e., $BF_3$ plus the complexing agent plus the support material). The actual concentration of F or B in the catalyst complex/support material depends on the complexing agent used.

In embodiments where the catalyst system is formed by adding to the support material a mixture comprising $BF_3$ and a complexing agent, the mole ratio of complexing agent to $BF_3$ is at least about 0.1, for example between about 0.1 and about 10. In other embodiments, the mole ratio is between about 0.2 and about 5. In some cases, the mole ratio is between about 0.2 and 2. In other cases, the mole ratio is between about 0.5 and about 2, for example between about 1.0 and about 1.9. In some embodiments, the mole ratio is between about 1.0 and about 1.3, for example, about 1.0.

In some embodiments, the weight ratio of support material to catalyst complex is less than about 1:1, for example, less than about 0.5:1, or less than about 0.25:1.

In at least one embodiment, the catalyst composition is 65 wt % (based on the total weight of the catalyst system) of a 1:1 $BF_3$-MeOH complex on a $SiO_2/Al_2O_3$ support containing about 50 wt % $Al_2O_3$.

In at least one embodiment, the catalyst composition is 65 wt % (based on the total weight of the catalyst system) of a 1:1 $BF_3$-MeOH complex on a Amberlyst or Amberlite support.

FIG. 1A is a flow diagram summarizing a method 100 of making a catalyst system according to one embodiment. Method 100 includes providing any metal oxide support material described herein at operation 105. At 110, the support material is calcined (or otherwise heated) at a predetermined temperature for a predetermined time as described above. Alternately, the support material is calcined (or otherwise heated) when first manufactured and/or recalcined (or reheated) as received. Method 100 includes forming the catalyst system by adding to the support material (a) a mixture comprising a Lewis acid (for example, $BF_3$), (b) a mixture comprising a Lewis acid (for example, $BF_3$) and a complexing agent, or (c) both at operation 115. The complexing agent may be any complexing agent described herein, and may be used in excess. The catalyst system obtained is a solid.

Figure 1B:
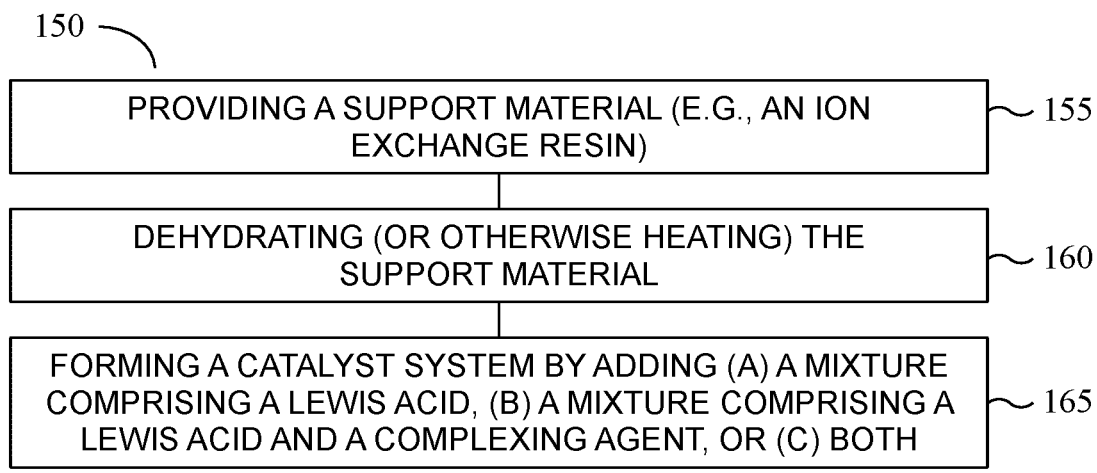
FIG. 1B shows a block diagram of a process to form a catalyst system according to some embodiments.

FIG. 1B is a flow diagram summarizing a method 150 of making a catalyst system according to another embodiment. Method 150 includes providing any ion exchange resin support material described herein at operation 155. Method 150 also includes dehydrating (or otherwise heating) the support material at a predetermined temperature for a predetermined time at operation 160 as described above. Alternately, the support material is dehydrated (or otherwise heated) when first manufactured and/or re-dehydrated (or reheated) as received. Method 150 includes forming the catalyst system by adding to the support material (a) a mixture comprising a Lewis acid (for example, $BF_3$), (b) a mixture comprising a Lewis acid (for example, $BF_3$) and a complexing agent, or (c) both at operation 165. The complexing agent may be any complexing agent described herein, and may be used in excess. The catalyst system obtained is a solid.

In some embodiments, addition of the mixture comprising a Lewis acid includes adding $BF_3$ gas uncomplexed with any complexing agent (as described herein). In such embodiments, the support material may be contacted with excess $BF_3$ gas in a stainless steel cylinder at a pressure of greater than about 0 psig (0 kPa), for example, between about 35 psig (about 250 kPa) and about 500 psig (about 3500 kPa), for about 4 hours. The cylinder is then vented and excess $BF_3$ is vented through a caustic scrubber.

Alternately, the catalyst complex (e.g., the Lewis acid and complexing agent) is added to the support material. In such cases, addition of the mixture comprising a Lewis acid and a complexing agent includes preforming the $BF_3$/complexing agent (the catalyst complex).

In some cases, the support material is slurried in a solvent during contact with the catalyst complex. Examples of solvents include non-coordinating, non-oxygenate, non-reactive solvents including non-polar or weakly polar solvents, such as alkanes (for example, isopentane, hexane, n-heptane, octane, nonane, decane, undecane, dodecane, tridecane, tetradecane, pentadecane, hexadecane, and higher alkanes), although a variety of other materials including cycloalkanes, such as cyclohexane. Alternately, halogenated hydrocarbons can be used as a solvent, such as carbon tetrachloride ($CCl_4$) and 1,2-dichloroethane.

During addition of the catalyst complex to the support material, the temperature of the mixture of the catalyst complex and the support material is maintained between about 0° C. and about 70° C. (for example, between about 10° C. and about 60° C., such as between about 10° C. and about 50° C., or at about room temperature). The reaction mixture is stirred while maintaining the temperature. Contact time, which may be the same as, or may include, the stirring time, is typically greater than about 0.1 hours (for example, between about 0.5 hours and about 24 hours, such as between about 2 hours and about 16 hours, or between about 4 hours and about 8 hours).

The solid catalyst systems can be prepared by any means in which the support materials can be contacted with $BF_3$ gas and/or $BF_3$ catalyst complexes while maintaining the complexing temperature with the support materials as described above. The complexing reaction can be exothermic, and the reaction of the catalyst and/or catalyst complex with the support material should be controlled to avoid loss of $BF_3$. Loss of $BF_3$ may occur by breaking of the $BF_3$ complex bonds with the substrate, liberating $BF_3$ gas which is then, at the higher temperatures, lost from the solid substrate. The catalyst and/or catalyst complex may be added by any mechanical means that allows sufficient mixing of the catalyst and/or catalyst complex with the support material. In at least one embodiment, the support material is placed in a rotating double cone mixer and the catalyst complex is added ratably such that the temperature is controlled within the desired range, e.g., not exceeding 50° C.-60° C.

In at least one embodiment, a tube-in-shell heat exchanger in which the support material is packed in the tubes and the cooling media is maintained on the jacket is used. In some embodiments, $BF_3$ gas and/or $BF_3$ catalyst complexes can be passed over the support material in the tubes until a maximum absorption, but less than excess, is obtained as evidenced by $BF_3$ or of the $BF_3$ catalyst complex exiting the tubes. If less than a maximum absorption is desired, the catalyst system can be back-blended with uncomplexed support material to the desired $BF_3$ concentration.

Figure 1C:
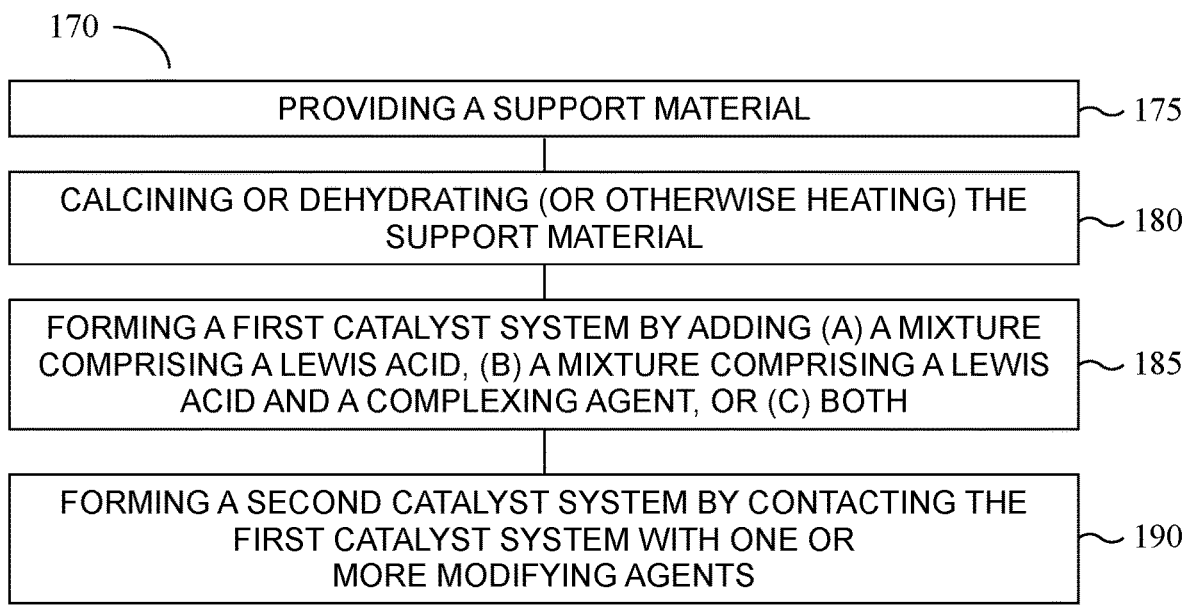
FIG. 1C shows a block diagram of a process to form a catalyst system according to some embodiments.

FIG. 1C is a flow diagram summarizing a method 170 of preparing a catalyst system according to another embodiment. In the method 170, the catalyst system can be further modified by contacting the solid catalyst system with suitable modifying agents, for example, the oxygen containing and nitrogen containing complexing agents described above. Such embodiments allow for the catalytic properties of the catalyst system(s) to be adjusted, for example, with respect to formation of alpha-vinylidene olefin isomers. Method 170 includes providing any support material described herein (metal oxide or organic support, e.g., ion exchange resin) described herein at operation 175. Method 170 includes calcining or dehydrating (or otherwise heating) the support material at a predetermined temperature for a predetermined time at operation 180 as described above. Alternately, the support material is dehydrated (or otherwise heated) when first manufactured and/or re-dehydrated (or reheated) as received. Operation 180 is dependent on the type of support material. Method 170 includes forming a first catalyst system by adding to the support material (a) a mixture comprising a Lewis acid (for example, $BF_3$), (b) a mixture comprising a Lewis acid (for example, $BF_3$) and a complexing agent, or (c) both at operation 185. The complexing agent may be any complexing agent described herein. The first catalyst system obtained is a solid. Method 170 includes forming a second catalyst system by contacting the first catalyst system with one or more modifying agents.

In some embodiments, the modifying agents can be added to the catalyst during the catalyst manufacturing step. Alternately, the modifying agents can be added to the feed during the polymerization step to further fine tune the catalyst properties such as selectivity to form HR-PIB. Thus, there are various methods of preparing the catalyst system. In some embodiments, $BF_3$ gas is added to the support material. Alternately, $BF_3$-complexing agent is added to the support material. In other embodiments, $BF_3$ gas is added to the support material and then complexing agent is added to the support material. In some embodiments, $BF_3$-complexing agent is added to the support material, and then modifying agents can be added to the support material. In other embodiments, $BF_3$ gas is added to the support material, then complexing agent is added to the support material, and a modifying agent is additionally added to the isobutylene feed. In some embodiments, $BF_3$-complexing agent is added to the support material, then modifying agents can be added to the support material, and a modifying agent is additionally added to isobutylene feed.

For example, the solid $BF_3$ complex is contacted with the modifying agent in a stirred or otherwise agitated vessel such as a rotating drum in which the modifying agent is sprayed onto the solid $BF_3$ complex and subsequently absorbed. The temperature should be maintained at less than about 50° C. by controlling the spray rate, or by cooling (for example with internal cooling coils or with an external jacket or both). The pressure should be greater than about 0 psig for example between about 35 and about 500 psig with pressure provided by a nitrogen pad. Once the prescribed amount of modifying agent has been added, the mixture is mixed for about an additional 4 hours after which time the mixing vessel is vented to atmospheric pressure and the thus formed catalyst discharged to storage containers. The containers are preferably padded with about 1 psig to about 5 psig of nitrogen. The amount of modifying agent is greater than about 0.5:1 mole ratio of modifying agent to $BF_3$ (such as a mole ratio between about 1:1 and about 2:1, for example between about 1:1 and about 1.4:1).

Suitable Polymer Precursor Feedstocks

The polymerization processes described herein utilize one or more polymer precursors as input to the catalyst system, or to be contacted with a catalyst system to form one or more polymer compositions. The polymer compositions (described in more detail below) include polymers made from one or more polymer precursors. Polymer compositions may include homopolymers, copolymers, or both. Polymer precursors suitable for both the processes and polymer compositions described herein are described in greater detail in the following.

Processes according to particular embodiments produce polymer compositions (for example, polyisobutylene including alpha vinylidenes, beta vinylidenes, and internal vinylidenes). For instance, in certain process embodiments, polymer precursors are contacted with the catalyst system. Each of the polymer precursors used in processes (and/or included in polymer compositions) herein is from a feedstock, for example, a liquid feedstock.

In some embodiments, the feedstock comprises about 1 wt % isobutylene (for example, greater than about 3 wt %, such as greater than about 5 wt %, greater than about 10 wt %, greater than about 15 wt %, greater than about 20 wt %, greater than about 25 wt %, greater than about 30 wt %, greater than about 35 wt %, greater than about 40 wt %, greater than about 45 wt %, greater than about 50 wt %, greater than about 55 wt %, greater than about 60 wt %, greater than about 65 wt %, greater than about 70 wt %, greater than about 75 wt %, greater than about 80 wt %, greater than about 85 wt %, greater than about 90 wt %, greater than about 95 wt %, greater than about 99 wt %, or greater than about 99.99 wt %) based on a total weight of the feedstock. Alternately, the feedstock consists essentially of isobutylene.

In some embodiments, the feedstock comprises other butylenes and/or unreactive compounds including alkanes and isoalkanes, such as $C_2$ to $C_{40}$ alkanes and isoalkanes.

In some embodiments, the feedstock comprises isobutylene. Example feedstocks include raffinate-1, also known as raff-1, or $C_4$ raffinate. The actual composition of raffinate-1 is variable depending on the source. A typical raffinate-1 feedstock might contain about 0.5 wt % $C_3$, about 4.5 wt % isobutane, about 16.5 wt % n-butane, about 38.5 wt % 1-butene, about 28.3 wt % isobutylene, about 10.2 wt % cis- and trans-2-butene, and less than about 0.5 wt % butadiene, and less than about 1.0 wt % oxygenates. Other examples of raffinate-1 feedstocks also include those provided in Table 2.

TABLE 2

Examples of Raffinate-1 Feedstocks

| Composition | Ex. 1 | Ex. 2 | Ex. 3 | Ex. 4 |
|---|---|---|---|---|
| $C_3$ (wt %) | 0.5 | — | 4.0 | 0.6 |
| isobutane (wt %) | 4.5 | 14.0 | 25.0 | 4.4 |
| n-butane (wt %) | 16.5 | 7.0 | 13.0 | 16.7 |
| 1-butene (wt %) | 38.5 | 45.0 | 15.0 | 30.0 |
| isobutylene (wt %) | 28.3 | 22.0 | 15.0 | 37.2 |
| cis-2-butene (wt %) | 10.2 (total of cis and trans isomers) | 6.7 | 15.5 | 2.3 |
| trans-2-butene (wt %) |  | 5.0 | 12.0 | 8.4 |
| butadiene (wt %) | 0.5 | 0.3 | 0.5 | 0.4 |

Amounts provided are approximate values.

The presence of oxygenates may affect the catalytic reaction. Some common oxygenates found in typical feedstocks; methanol, ethanol, dimethyl ether, diethyl ether, t-butanol, MTBE. While not wishing to be bound by theory, it is believed that oxygenates have a twofold impact on isobutylene polymerization: oxygenates can act as initiators for polymerization and thus can reduce molecular weight and broaden molecular weight distribution, and oxygenates can complex with the $BF_3$ catalyst possibly resulting in complexes that can yield undesirable PIB olefin isomers and the further complexing can reduce the activity of the catalyst.

The $C_3$ and the n-butane are unreactive and pass through the reactor unchanged and are removed from the reaction mixture in the downstream stripping steps. Reaction of isobutylene depends on various factors including reaction conditions, and thus adjusting conditions can allow for varied final products. The 1- and 2-butenes may react to varying degrees depending on the catalyst type and reactor conditions. The unreacted olefins may also be removed from the polymer product in the downstream stripping steps.

Another feedstock that can be used is the effluent from a dehydrogenation of isobutane to isobutylene. Typically, such effluents contain between about 42 wt % and about 45 wt % isobutylene, and between about 50 wt % and about 52 wt % isobutane, with the balance being $C_3$, normal butanes, butylenes, and butadiene. This feedstock is particularly suitable when unreactive isobutane may be utilized, for example, in cooperation with an isobutane dehydrogenation unit.

In at least one embodiment, the feedstock comprises at least about 80 wt % isobutylene (for example, at least about 90 wt %, such as at least about 99 wt %) with the balance being isobutane and minor amounts of $C_3$, normal butanes, butylenes, and butadiene. This feedstock is also suitable for production of HR-PIB.

When using any feedstock, any unreacted polymer precursor may be recycled.

Copolymers may be formed if other olefins (i.e. other polymerizable compounds) are present in the feedstock. Feedstocks comprising higher amounts of isobutylene as the olefin precursor more readily produce HR-PIB. However, feedstocks (such as raffinate streams, which have lower amounts of isobutylene) may be used. Raffinate streams contain, in addition to isobutylene, other butylenes including 1-butene, and cis- and trans-2-butene. These butylene compounds can co-polymerize with the isobutylene to give butene segments in the polymer chain. These butylene compounds are less reactive than isobutylene and therefore tend to end cap growing of the polymer chains and produce lower Mn polymers. Also, the end-capped chains tend not to be alpha vinylidene groups. Reaction conditions can be adjusted to selectively polymerize isobutylene and minimize the normal butene reactions, usually involving lower temperatures reaction temperatures.

Polymerization Processes

As noted previously, embodiments of the present invention include polymerization processes wherein polymer precursors are contacted with a catalyst system to form a polymer composition. The polymer compositions include polyisobutylene (PIB), and in particular highly reactive polyisobutylene (HR-PIB). For the polymerizations, $BF_3$ does not need to be mixed with a complexing agent, as $BF_3$ on the support material is capable of forming polymer compositions including PIB, and particularly HR-PIB. In other embodiments, the catalyst is complexed with a complexing agent and is capable of forming the same polymer compositions. Typically, use of a complexing agent helps produce PIB with a high content of alpha vinylidene olefin isomer. While not wishing to be bound by theory, it is believed that complexing $BF_3$ mediates some of the acidity of $BF_3$ and reduces the rate of isomerization of initially formed alpha vinylidene isomers to more internally located and less reactive isomers.

Figure 2A:
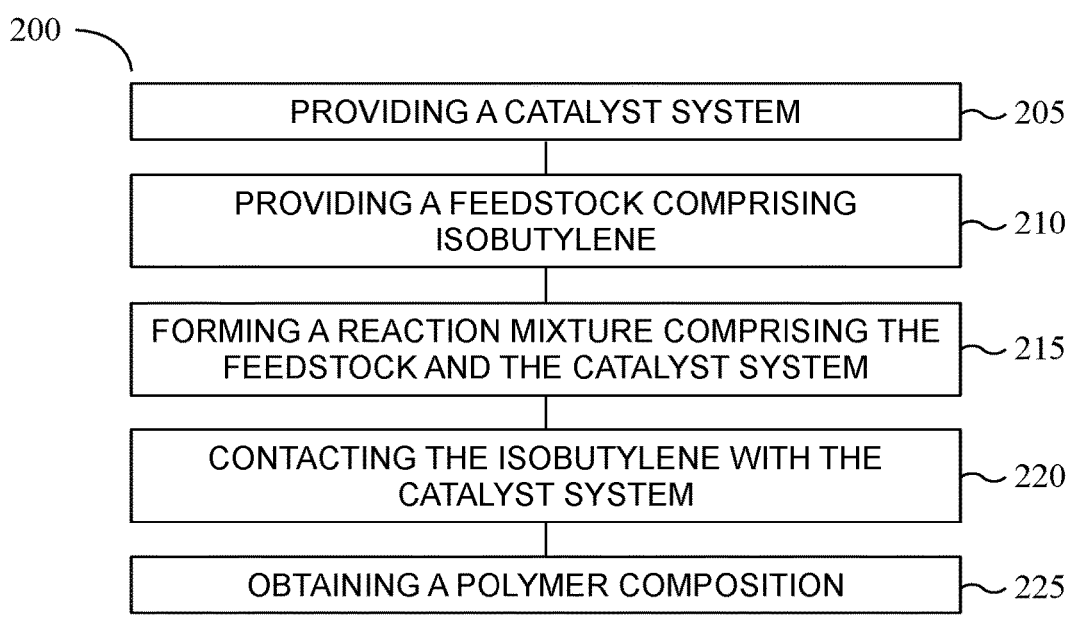
FIG. 2A shows a block diagram of a process to form a polymer composition according to some embodiments.

FIG. 2A is a flow diagram summarizing a method 200 of making a polymer composition according to one embodiment. The method includes providing a catalyst system at operation 205. The catalyst system includes (a) any support material described herein (for example Group IIIA, Group IVA, and Group IVB metal oxides, and combinations thereof, such as $Al_2O_3$, $ZrO_2$, $TiO_2$, $SnO_2$, $CeO_2$, $SiO_2$, $SiO_2/Al_2O_3$, and combinations thereof); and (b) a Lewis acid (for example, $BF_3$). In some versions, the catalyst system further comprises a complexing agent, including any complexing agent described herein.

The catalyst system can include (a) an organic support material (for example an ion exchange resin, such as an anionic exchange resin, a cationic exchanges resin (such as Amberlyst™ and Amberlite™ resins), and/or combinations thereof); and (b) a Lewis acid (for example, $BF_3$). In some embodiments, the catalyst system further comprises a complexing agent, including any complexing agent described herein.

In some embodiments, a catalyst system includes (a) a combination of inorganic oxide (i.e., $Al_2O_3$, $ZrO_2$, $TiO_2$, $SnO_2$, $CeO_2$, $SiO_2$, $SiO_2/Al_2O_3$, and combinations thereof) and organic support (i.e., an ion exchange resin, such as an anionic exchange resin, a cationic exchange resin, or a combination thereof); and (b) a Lewis acid (for example, $BF_3$). In some embodiments, the catalyst system further comprises a complexing agent, including any complexing agent described herein.

Method 200 further includes providing a feedstock comprising isobutylene at operation 210. The feedstock can be a liquid feedstock. Any feedstock described herein may be used.

Method 200 includes forming a reaction mixture comprising the feedstock and the catalyst system at operation 215, as described below. Method 200 further includes contacting the isobutylene with the catalyst system at operation 220 and obtaining a polymer composition at operation 225. Polymer compositions are described below. In some embodiments, forming the reaction mixture comprising the feedstock and the catalyst system comprises flowing the catalyst system into a reactor and flowing the feedstock into the reactor, and wherein contacting the isobutylene with the catalyst system comprises maintaining a temperature of the reaction mixture at a predetermined temperature or range of temperatures.

It should be noted that one or more of the operations may occur before or after that shown in FIG. 2A or may occur simultaneously in some embodiments. For example, operation 205 may occur after operation 210.

Figure 2B:
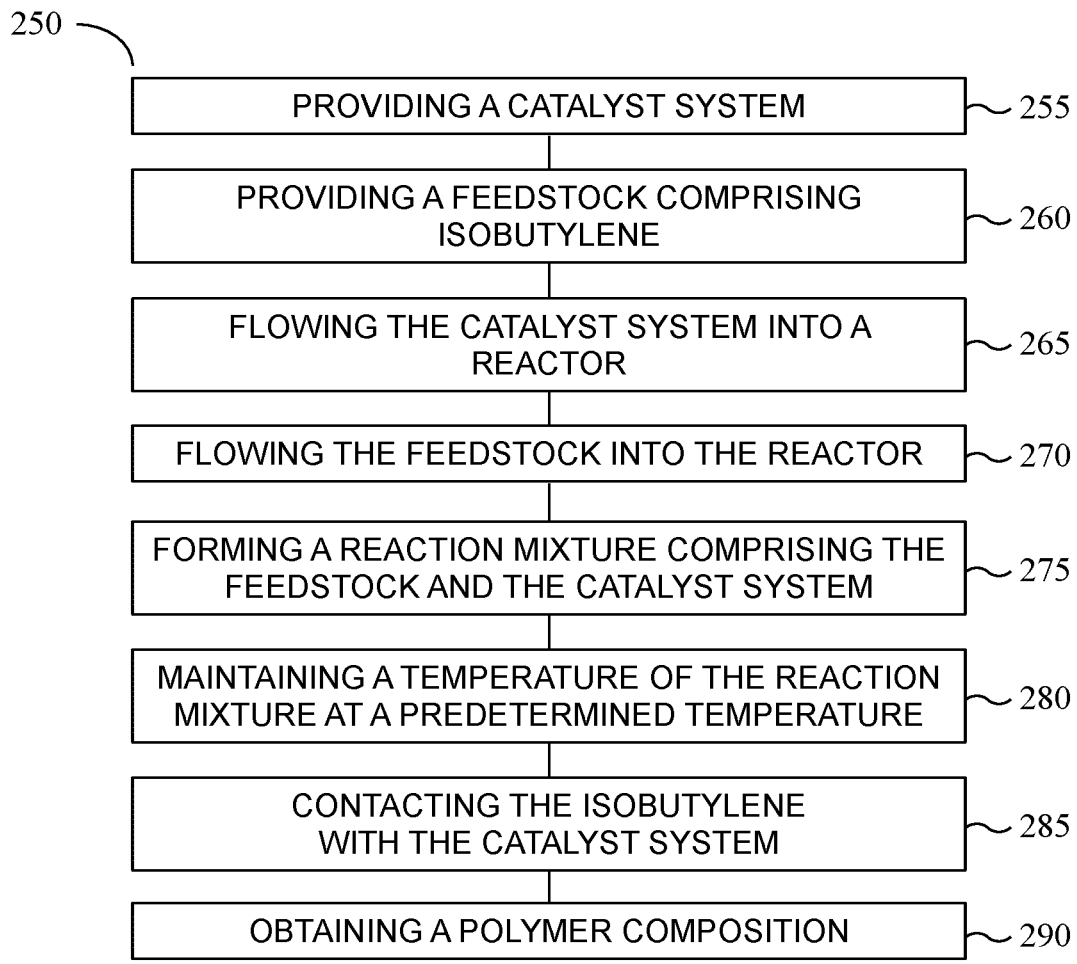
FIG. 2B shows a block diagram of a process to form a polymer composition according to some embodiments.

FIG. 2B is a flow diagram summarizing a method 250 of making a polymer composition according to another embodiment. The method 250 includes providing a catalyst system at operation 255, and providing a feedstock comprising isobutylene at operation 260. Operations 255 and 260 are described above according to operations 205 and 210, respectively.

Method 250 further includes flowing the catalyst system into a reactor at operation 265 and flowing the feedstock comprising isobutylene into the reactor at operation 270 as described below. In some casess, the catalyst system is provided to the reactor as a slurry. The slurry may comprise the catalyst system and one or more oligomeric byproducts and/or light polymers from PIB polymerization itself (for example, $C_8$ to $C_{16}$ oligomers, such as $C_8$ and/or $C_{12}$ PIB, and PIB having a molecular weight between about 350 Da and about 500 Da). In some embodiments, the slurry optionally comprises a non-polar carrier solvent such as alkanes from octane through hexadecane and higher alkanes.

Method 250 includes forming a reaction mixture comprising the feedstock and the catalyst system at operation 275, and includes maintaining a temperature of the reaction mixture at a predetermined temperature range, for example, between about −35° C. and about 100° C., at operation 280.

Method 250 further includes contacting the isobutylene with the catalyst system at operation 285, and obtaining a polymer composition at operation 290. Polymer compositions are described below.

It should be noted that one or more of the operations may occur before or after that shown in FIG. 2B or may occur simultaneously in some embodiments. For example, operations 265 may occur after operation 270.

Methods of making compositions can include an optional operation of calcining the support material as described above. In some embodiments, methods of making compositions include forming the catalyst system by adding to the support material (a) a mixture comprising $BF_3$, (b) a mixture comprising $BF_3$ and a complexing agent, or (c) both.

In some embodiments, suitable concentrations of the catalyst system in the reaction mixture are greater than about 500 ppm based on a total weight of the catalyst feed, wherein a $BF_3$ concentration in the reaction mixture is about 125 ppm based on the total weight of the catalyst feed. In at least one embodiment, the concentration of the catalyst system in the reaction mixture is between about 500 ppm and about 10,000 ppm based on a total weight of the catalyst feed, and wherein a $BF_3$ concentration in the reaction mixture is between about 125 ppm and about 2,500 ppm based on the total weight of the catalyst feed. Alternately, the concentration of the catalyst system in the reaction mixture is between about 1,000 ppm and about 5,000 ppm based on a total weight of the catalyst feed, and wherein a $BF_3$ concentration in the reaction mixture is between about 250 ppm and about 1,250 ppm based on the total weight of the catalyst feed.

Furthermore, although known polymerization techniques may be employed, processes according to certain embodiments utilize particular conditions (e.g., temperature and pressure). Temperatures generally may include a temperature of between about −35° C. to about 100° C., for example, between about 0° C. and about 70° C. ° C. Pressure may depend on the desired scale of the polymerization system. For example, in some polymerizations, pressure may generally be conducted at the autogenous pressure of the reaction mixture at the selected reaction temperature. In some embodiments, the pressure of the reactor is greater than about 0 psig (about 0 kPa) (for example, between about 35 psig (about 250 kPa) and about 500 psig (about 3500 kPa), such as between about 35 psig (about 250 kPa) and about 500 psig (about 3500 kPa), between about 50 psig (about 350 kPa) and about 300 psig (about 2100 kPa), or between about 35 psig (about 250 kPa) and about 100 psig (and about 700 kPa)). Reaction pressure can depend on the type of reactor used. For continuous stirred tank reactors (CSTR) in which cooling is provided by ebullient cooling, that is by partial volatilization of the reaction mixture, the volatilization temperature, and thus the reaction temperature, is dependent on reactor pressure. Lower pressure provides lower temperatures, and for practical purposes, with the lower limit set by the boiling point of the reaction mixture at ambient pressure. In the case of butylenes, this is around about −5° C. to about −10° C. In cases requiring lower temperatures, other inerts are added with lower boiling points, such as propane. In loop reactors or CSTR not using ebullient cooling reaction pressure is not an issue as long as the reaction mixture is maintained in the liquid phase. For PIB this is typically greater than about 0 psig (about 0 kPa), for example greater than about 35 psig (about 250 kPa).

In the polymerization processes described herein, the run time of the reaction is up to about 600 minutes (for example, up to about 300 minutes, such as between about 1 minute and about 250 minutes, between about 1 minute to about 150 minutes, or between about 1 to about 120 minutes).

Heterogeneous $BF_3$ catalyst system processes of the present disclosure are also characterized by reaction times of less than about 4 minutes (for example, less than about 3 minutes, less than about 2 minutes, or less than about 1 minute).

Times and temperatures are controlled such that no significant olefin isomerization occurs during polymerization and conversion and molecular weights are in desirable ranges. Reaction temperatures and pressures, and polymer precursor concentrations can be selected to control for the Mn of the polymer composition. For example, higher temperatures typically provide polymer compositions with higher Mn.

Temperature control in the reactor is obtained by offsetting the heat of polymerization with reactor cooling by using reactor jackets or cooling coils to cool the contents of the reactor, auto refrigeration, pre-chilled feeds, vaporization of liquid medium (diluent, polymer precursors, or solvent) or combinations of all three. In the case of CSTR with ebullient cooling, the boiling mixture is cooled with a chilled overhead condenser. For non-ebullient cooled CSTR any type of heat exchanger could be used to chill the reactor jacket using any suitable cooling media. In some embodiments, a fast reactor is used. A fast reactor is one in which the reactor is the heat exchanger with the reaction taking place in the tubes with cooling on the shell. Any type of suitable cooling media can be used depending mainly on operating temperature range. Adiabatic reactors with pre-chilled feeds may also be used. In some embodiments, the reactor(s) is operated in as much of an isothermal mode as possible. Non-isothermal reactor operation results in broader molecular weight distributions. In series operation, the second reactor temperature is higher than the first reactor temperature. In parallel reactor operation, the temperatures of the two reactors are independent.

Suitable reactors for the polymerization include batch, continuous stirred tank reactor (CSTR), plug flow, fluidized bed, immobilized bed, and fixed bed. More than one reactor may be operated in series or parallel. These reactors may have or may not have internal cooling or heating, and the feeds may or may not be refrigerated.

CSTR

In some embodiments, and for CSTR, the catalyst system is slurried with one or more oligomeric byproducts and/or light polymers from PIB polymerization itself (for example, $C_8$ to $C_{16}$ oligomers, such as $C_8$ and/or $C_{12}$ PIB, and PIB having a molecular weight between about 350 Da and about 500 Da), at about a 10 wt % concentration. The catalyst system slurry is then injected into the incoming feed stream. In some embodiments, the catalyst system slurry is injected into the incoming feed stream at a point where the physical distance between the injection point in the feed line and the point at which the feed enters the reactor is at a minimum. In some embodiments, the injection point for the catalyst may be on the suction side of the feed pump to provide mixing. In some embodiments, the slurry optionally comprises a non-polar carrier solvent such as alkanes from octane through hexadecane and higher alkanes. In some embodiments, the concentration of the catalyst system in the reaction mixture for CSTR is between about 1,000 ppm and about 2,000 ppm based on a total weight of the catalyst feed, wherein a $BF_3$ concentration is between about 250 ppm and about 500 ppm based on the total weight of the feed. Residence times are on the order of less than about 600 minutes (for example, about 120 minutes, such as less than about 60 minutes, or between about 30 minutes to about 60 minutes) and can be controlled by catalyst system concentration. Higher catalyst system concentrations, up to a point, increase the reaction rate. The polymerization reaction is highly exothermic and a limiting factor to reaction rate is the ability to remove the heat of reaction.

In conventional plants that utilize CSTR, the reaction mixture comprising the catalyst system is flowing upward in the reactor, through at least a first portion and a second portion. The first portion of the reactor is relatively narrow to provide higher velocity and higher catalyst system mixing. The second portion of the reactor is wider to provide lower velocity and less catalyst system mixing, allowing for some settling of the catalyst system back into the reaction zone. The crude reaction mixture exits near the top of the reactor with some catalyst system being carried out with the exiting crude reaction mixture. The catalyst system exiting the reactor is made up with the catalyst system injection such that a constant catalyst system amount is maintained in the reactor. The reaction temperature can be maintained by vaporization of a portion of the isobutylene containing feed controlled by the reactor pressure; higher reactor pressure gives higher reaction temperature according to the vapor pressure curve of the system butylenes. Mn of the polymer is controlled by reaction temperature with higher reaction temperature giving lower Mn. Reaction temperatures between about −5° C. and about 5° C. provide polymers having an Mn of about 2,300 daltons. Reaction temperatures between about 18° C. and about 22° C. provide polymers having an Mn of about 1,000 daltons. The crude reaction mixture leaving the reactor is treated with aqueous caustic streams to quench and wash out the catalyst system.

Alternately, these plants can be modified to include a catalyst system filtration (or other solid-liquid separation devices as described below) to remove the catalyst system thereby eliminating the water washing operations and the need to dispose of waste water containing catalyst system residues. Optionally, a water washing operation may be performed depending on application or type of plant. Removal of the catalyst system also allows for recycling of the catalyst system. The plants can also include one or more distillation columns as described below. Any standard Cosden type polymerization units (such as CSTR plants using ebullient cooling) can employ the technology described in this disclosure. Other plants can be used such CSTR plants without ebullient cooling and tubular reactor plants.

Tubular Loop Reactors

In some embodiments, and for fast reactor modes, the reactor is a tube-in-shell heat exchanger with the reaction taking place in the tubes and cooling provided through the shell side of the heat exchanger with the heat of reaction taken out by an external chiller unit.

One reactor design is a two-pass heat exchanger. Using a slurried catalyst system, the reaction is carried out in the liquid phase at pressures of at least about autogenous pressures, typically greater than about 0 psig (0 kPa) (for example, between about 35 psig (about 250 kPa) and about 300 psig (about 2100 kPa), between about 50 psig (about 345 kPa) and about 300 psig (about 2100 kPa), or between about 100 psig (about 700 kPa) and about 150 psig (about 1000 kPa)).

In some embodiments, a tubular loop reactor is used. In such embodiments, the circulation loop is provided to deliver high velocity in the tubes at a Reynold's number of the circulating liquid in the tubes greater than about 2,000. In some embodiments the residence time in the reactor is less than about 120 minutes (for example, less than about 90 minutes, less than about 60 minutes, less than about 30 minutes, less than about 10 minutes, less than about 4 minutes, less than about 3 minutes, less than about 2 minutes, or less than about 1 minute; alternately, between about 30 seconds and about 4 minutes). Reynolds numbers greater than about 2,000 allow for turbulent flow in the tubes which increases the heat exchange and the ability to remove the heat of reaction in very short periods of time. The ability to quickly remove the heat of reaction allows for operation at very short residence times. The concentration of the catalyst system in the reaction mixture is between about 500 ppm and about 10,000 ppm based on a total weight of the catalyst feed, and wherein a $BF_3$ concentration in the reaction mixture is between about 125 ppm and about 2,500 ppm based on the total weight of the catalyst feed. In some embodiments, the concentration of the catalyst system in the reaction mixture is between about 1,000 ppm and about 5,000 ppm based on a total weight of the catalyst feed, and wherein the $BF_3$ concentration in the reaction mixture is between about 250 ppm and about 1,250 ppm based on the total weight of the catalyst feed. Alternately, the concentration of the catalyst system in the reaction mixture is greater than about 2,000 ppm based on a total weight of the catalyst feed, and wherein the $BF_3$ concentration is greater than about 500 ppm based on the total weight of the catalyst feed.

In some embodiments, the reactor system is a tubular loop reactor in which the Reynold's number of the circulating liquid in the tubes is greater than about 2,000 and the residence time in the reactor is less than about 120 minutes (for example, less than about 90 minutes, less than about 60 minutes, less than about 30 minutes, less than about 10 minutes, less than about 4 minutes, less than about 3 minutes, less than about 2 minutes, or less than about 1 minute; alternately, between about 30 seconds and about 4 minutes) such that the solid catalyst system is immobilized in the tubes by attaching the catalyst system particles to a suitable substrate. Because the catalyst system is constrained in the tubes, no post reaction recovery is required. Suitable substrate compositions and geometries for attaching the solid $BF_3$ catalyst system particles can include ceramic mats such as those sold by NGK Insulators for use in modern catalytic convertors, or wire mesh or wire fibers. As such, the catalyst system particles (or catalyst complex) can be used in fixed bed reactors to produce HR-PIB. The solid catalyst systems of the present disclosure can be further attached or otherwise immobilized to other solid substrates chemically, physically, or mechanically means, or a combination thereof.

For tubular loop reactors, the catalyst system is slurried with one or more oligomeric byproducts and/or light polymers from PIB polymerization itself (for example, $C_8$ to $C_{16}$ oligomers, such as $C_8$ and/or $C_{12}$ PIB, and PIB having a molecular weight between about 350 Da and about 500 Da), at about 10 wt % catalyst system concentration. The catalyst system slurry is then injected into the incoming feed stream. In some embodiments, the catalyst system slurry is injected into the incoming feed stream at a point where the physical distance between the injection point in the feed line and the point at which the feed enters the reactor is at a minimum. In some embodiments, the injection point for the catalyst may be on the suction side of the feed pump to provide mixing. In some embodiments, the slurry optionally comprises a non-polar carrier solvent such as alkanes from octane through hexadecane and higher alkanes.

After the reaction effluent leaves (or is discharged from) the CSTR, tubular loop, or other reactors, the reaction effluent may be purified by separation, atmospheric stripping, vacuum stripping, or a combination thereof to remove byproducts, unreactive compounds, catalyst residues, and unreacted polymer precursors. Unreacted polymer precursors may be recycled. For example, such purification may be accomplished in a plant by passing the crude polymer composition through a solid-liquid separation device and then through a pressure distillation column to remove the unreacted polymer precursors and other non-reacted residues. The distillation columns may be atmospheric and/or vacuum distillation columns.

Passing the crude polymer compositions through a solid-liquid separation device serves to separate solid catalyst system particles, unreacted residues, and other solids from the crude polymer compositions. Distilling serves to separate dimers, oligomers, unreacted polymer precursors, unreactive compounds, and other non-reacted residues from the polyisobutylene polymer composition.

Accordingly, and in some embodiments, the method of making a polymer composition includes discharging the polymer composition from the reactor; feeding the polymer composition one or more suitable separation apparatuses (for example one or more of a suitable solid-liquid separation devices (such as filters, centrifugation devices, and cyclone separation devices), and one or more of a distillation devices (e.g., distillation columns)); and discharging the polymer composition from the one or more separation apparatuses. Any of those operations may be repeated one or more times.

In the distilling operation, the crude polyisobutylene polymer is treated in a distillation column to remove unwanted species. The distilling operation can include passing the crude polyisobutylene polymer composition to a first distillation column, feeding the crude polyisobutylene polymer composition under pressure in the first distillation column so as to remove unreacted polymer precursors (e.g., isobutylene) and unreactive compounds (e.g., isobutane and isobutylene) from the crude polyisobutylene polymer composition, and discharging the polyisobutylene polymer composition from the first distillation column. The distilling operation may further include passing the discharged polyisobutylene polymer composition from the first distillation column to a second distillation column, feeding the polyisobutylene polymer composition in the second distillation column at atmospheric pressure so as to remove $C_8$ (dimer) byproducts from the polyisobutylene polymer composition, and discharging the polyisobutylene polymer composition from the second distillation column. The distilling operation may further include passing the discharged polyisobutylene polymer composition from the second distillation column to a third distillation column, feeding the polyisobutylene polymer composition in the third distillation column under vacuum conditions so as to remove higher oligomer byproducts (e.g., $C_{12}$ and $C_{16}$) from the polyisobutylene polymer composition, and discharging the polyisobutylene polymer composition from the third distillation column. Any of those operations may be repeated one or more times.

Each of the various polymerization processes described herein can be carried out using general polymerization techniques known in the art. Any suspension, homogeneous, bulk, slurry, solution slurry, or gas phase polymerization process known in the art can be used. Such processes can be run in a batch, semi-batch, or continuous mode. In some embodiments, homogeneous polymerization processes and slurry processes are used. A homogeneous polymerization process is defined to be a process where at least about 90 wt % of the product is soluble in the reaction media. A bulk process is defined to be a process where polymer precursors itself are used as the reaction medium and the concentration of polymer precursors in all feeds to the reactor is about 70 vol % or more. Alternately, no solvent or diluent is present or added in the reaction medium, (except for the small amounts used as the carrier for the catalyst system or other additives, or amounts typically found with the polymer precursors). In another embodiment, the process is a slurry process. In the slurry process, a suspension of supported catalyst is employed and polymer precursors are polymerized on the catalyst particles and/or catalyst systems.

In some slurry process embodiments, the suspension includes diluent. The suspension can be intermittently or continuously removed from the reactor where the volatile components are separated from the polymer and recycled, optionally after a distillation, to the reactor.

In some embodiments, the polymerization is conducted in an aliphatic hydrocarbon solvent (e.g., isobutane, butane, pentane, isopentane, hexanes, isohexane, heptane, octane, dodecane, and mixtures thereof, and the like). Other additives may also be used in the polymerization, as desired, such as one or more scavengers, promoters, modifiers, reducing agents, and oxidizing agents.

Polymer Compositions

The polymerization processes described herein produce polymer compositions. In some embodiments, the polymer compositions are polyisobutylenes having one or more of the following properties:

1) A number average molecular weight, Mn, of greater than about 320 daltons (for example between about 320 daltons and about 10,000 daltons, such as between about 320 daltons and about 5,000 daltons, or between about 320 daltons and about 2,500 daltons, such as about 350 daltons, about 700 daltons, about 950 daltons, about 1300 daltons, or about 2,250 daltons).

2) the polyisobutylene comprises a first portion comprising polymer chains having alpha vinylidene groups, and one or more of a second portion comprising polymer chains having beta vinylidene groups and a third portion comprising polymer chains having internal vinylidene groups, wherein: the first portion is greater than about 75 wt % (for example, greater than about 80 wt %, such as greater than about 82 wt %, greater than about 85 wt %, greater than about 87 wt %, greater than about 90 wt %, greater than about 92 wt %, greater than about 94 wt %, or greater than about 95 wt %) based on a total weight of the composition, and a total content of the second portion plus the third portion is less than about 25 wt % (less than about 20 wt %, less than about 18 wt %, less than about 15 wt %, less than about 13 wt %, less than about 10 wt %, less than about 8 wt %, less than about 6 wt %, or less than about 5 wt) based on the total weight of the composition.

3) A polydispersity index (PDI), which is the ratio of Mw/Mn, of less than about 5 (for example, less than about 2.5, less than about 2, less than about 1.5, or less than about 1.3).

In addition to isobutylene olefin isomers, by-products of the polymerization can include $C_8$-$C_{16}$ by-products, for example, dimers ($C_8$) and oligomers ($C_{12}$-$C_{16}$). Copolymers may also be produced if other olefin precursors are present in the feedstock. Feedstocks comprising higher amounts of isobutylene as the polymer precursor more readily produce HR-PIB. However, feedstocks (such as raffinate streams, which have lower amounts of isobutylene) may be used. Raffinate streams contain, in addition to isobutylene, other butylenes including 1-butene, and cis- and trans-2-butene. These butylene compounds can co-polymerize with the isobutylene to give butene segments in the polymer chain. These butylene compounds are less reactive than isobutylene and therefore tend to end cap growing of the polymer chains and produce lower Mn polymers. In addition, the end-capped chains tend not to be alpha vinylidene groups. Reaction conditions can be adjusted to selectively polymerize isobutylene and minimize the normal butene reactions, usually involving lower temperatures reaction temperatures.

Applications

Any of the foregoing polymers, including compounds thereof, may be used in a variety of end-use applications, including any application suitable for PB, PIB, and HR-PIB. Examples of applications for HR-PIB include subsequent derivatization reactions to produce fuel and lubricant additives. Examples of applications for PIB and HR-PIB include adhesives, sealants, lubricants & greases, metal working, cosmetics, and mining.

Test Methods

Polymer Compositions. The type and amount of each olefin isomer (i.e., alpha vinylidene, beta vinylidene, and other isomers) is determined by $^{13}C$ NMR.

$^{13}C$ NMR spectra were collected using a 500 MHz Bruker pulsed fourier transform NMR spectrometer equipped with a 10 mm Broad Band Observation (BBO) probe at about room temperature. The polymer sample is dissolved in chloroform-d ($CDCl_3$) and transferred into a 10 mm glass NMR tube. Typical acquisition parameters are inverse-gated (IG) decoupling, a 90° pulse, and a 40 second relaxation delay. Chemical shifts are determined relative to the $CDCl_3$ signal which is set to about 77.2 ppm. To achieve maximum signal-to-noise for quantitative analysis, multiple data files may be added together. The spectral width was adjusted to include all of the NMR resonances of interest. $^{13}C$ NMR shifts for the olefin carbon atoms are provided below in Table 3.

TABLE 3

NMR Data and Weight Percent of Polymer Compositions

| Olefin Isomer | Chemical Shifts (ppm) ($^{13}C$ NMR ($CDCl_3$)) | Weight Percent (wt %) |
|---|---|---|
| alpha vinylidene isomer | 143 (R$\underline{C}$($CH_3$)=$CH_2$); 115 (RC($CH_3$)=$\underline{C}H_2$) | >80 |
| terminal beta vinylidene isomer | 136 (R$\underline{C}$(H)=C($CH_3$)$_2$); 128 (RC(H)=$\underline{C}$($CH_3$)$_2$) | <10-15 |
| terminal trisubstituted vinylidene isomer (1) | 134 (R$\underline{C}$($CH_3$)=CH($CH_3$)); 123 (RC($CH_3$)=$\underline{C}$H($CH_3$)) | <1 |
| terminal trisubstituted vinylidene isomer (2) | 139 (R$\underline{C}$(H)=C($CH_3$)($CH_2CH_3$)); 130 (RC(H)=$\underline{C}$($CH_3$)($CH_2CH_3$) | <2-5% |
| terminal tetra substituted vinylidene isomer | 133 (R$\underline{C}$($CH_3$)=C($CH_3$)$_2$); 122 (RC($CH_3$)=$\underline{C}$($CH_3$)$_2$) | <2-5% |
| internal disubstituted vinylidene isomer | (R$\underline{C}$(=$CH_2$)($CH_3$)); 116 (RC(=$\underline{C}H_2$)($CH_3$)) | <2-5% |

All data is provided in approximate values.

Polymer Molecular Weight: Molecular weights (weight-average molecular weight, Mw, number-average Molecular weight, Mn) and PDI (ratio of Mw/Mn) are determined using gel permeation chromatography (GPC). Equipment includes a Waters Alliance 2695 HPLC system with a differential refractive index detector (DRI). A typical GPC procedure is to dissolve the sample to be tested in tetrahydrofuran (THF) at a concentration of about 1 wt % to about 10 wt %. The polymer solution is pumped through a series of columns packed with Styragel™ beads of known porosity. Typical pore diameters range from about 10,000 Å down to about 50-100 Å, and a typical column string includes a $10^4$ Å column, a $10^3$ Å column, a 1000 Å column and an about 2-100 Å columns. For example, Waters Styragel™ HR columns 1, 3, and 4 can be used. The nominal flow rate is about 1.0 ml/min. The various transfer lines, columns and differential refractometer (the DRI detector) are contained in an oven maintained at about 40° C. Elution solvent is THF. There is a 105-sample carousel for automatic injections. Empower 2 is the software system for controlling the separation and analysis.

The columns are calibrated with known molecular weight standards, both narrow distribution standards and broad distribution standards (for example, polystyrene standards from a molecular weight of 500 to 400K). From the calibration, Mn and Mw can be determined for a polymer sample. PDI is the ratio of Mw/Mn.

Polymer solutions for GPC are prepared by placing the dry polymer in a glass container, adding the desired amount of THF, and then filtering the mixture through a 0.45-micron nylon or PTFE filter. All quantities are measured gravimetrically. The concentration of polymer to THF is about 10 to 20 mg/ml Prior to running each sample the DRI detector and the injector are purged. Flow rate in the apparatus is then increased to about 0.5 ml/minute, and the DRI is allowed to stabilize for about 8 hours to about 9 hours before injecting the first sample. Each sample run takes about one hour to complete.

EXAMPLES

The present disclosure, while not meant to be limited by, may be better understood by reference to the following examples and tables.

Catalyst System Examples 1-6

Calcination of Support Material and Addition of Lewis Acid to Gamma-Alumina Support Material. Gamma-alumina beads (γ-alumina spheres) were calcined for about 2 hours at various temperatures (i.e., about 25° C., about 250° C., about 400° C., about 550° C., about 700° C., and about 900° C.). The beads were treated with an excess of $BF_3$ gas in a stainless-steel cylinder at a pressure of about 35 psig (about 250 kPa) for about 4 hours to form catalyst system examples 1-6. The cylinder was then vented and any remaining excess $BF_3$ was vented through a caustic scrubber. The active amount of $BF_3$ gas absorbed by the support material was determined gravimetrically.

The data are summarized in Table 4 and show that the concentration of $BF_3$ on the alumina at calcination temperatures below about 250° C. is about 16 wt % $BF_3$. As the calcination temperature is increased above about 400° C., the concentration of $BF_3$ on the alumina increased to between about 23 wt % and about 24 wt % and remained about constant up to about 700° C. Calcination temperatures for these gamma alumina beads are, for example, between about 400° C. and about 900° C., such as, between about 550° C. to about 700° C. Gamma-alumina support material calcination temperatures above about 700° C. can result in sintering of the gamma-alumina support material resulting in decreased surface area.

TABLE 4

$BF_3$ Capacity on Gamma-Alumina As a Function of Calcination Temperature

| Catalyst System Example | Calcination Temperature (° C.) | $BF_3$ (g) (wt %) |
| --- | --- | --- |
| 1 | 25 | 16.3 |
| 2 | 250 | 15.4 |
| 3 | 400 | 22.3 |
| 4 | 550 | 23.6 |
| 5 | 700 | 23.5 |
| 6 | 900 | 23.5 |

Polymer Composition Example 1

Polymerization of Isobutylene to Make HR-PIB Using the $BF_3$ on Gamma-Alumina Catalyst System. A total weight of about 63 g of high purity isobutylene (HPIB) containing greater than 99.9 wt % isobutylene was charged to a 500 ml pressure bottle and cooled using an ice/salt bath to a temperature of about −5° C. About 0.4 grams, 6,400 ppm, of $BF_3$ on alumina beads (at about 23.5 wt % active $BF_3$) was added to the isobutylene reaction mixture with stirring. Stirring was maintained during the course of the reaction. After about 40 minutes, the reaction was quenched by decanting the mixture while still cold to remove the catalyst beads. Optionally, the crude mixtures may be washed with water. The reaction mixture was then heated at about 75° C. for about 2 hours to remove unreacted isobutylene. Gravimetric analysis showed conversion to HR-PIB was about 76%. This crude, unstripped sample was analyzed by $^{13}C$ NMR and found to contain about 72 wt % alpha vinylidene olefin isomer with a molecular weight (Mn) of about 608 daltons. Conversion is the amount of HPIB converted to dimers, oligomers and HR-PIB, and selectivity is the amount of converted isobutylene that is HR-PIB product, excluding dimers and oligomers.

The crude, unstripped sample (about 25 g) was then charged to a 50 ml boiling flask and stripped using a distillation column at a temperature setting of about 150° C. for about 1 hour, then at a setting of about 175° C. for about 1 hour and then at a setting of about 200° C. for about 1 hour. The maximum internal temperature reached was about 183° C. The final stripped sample was analyzed by $^{13}C$ NMR and found to contain about 82 wt % alpha vinylidene olefin isomer with a Mn of about 900 daltons. Gravimetric analysis of the final stripped sample indicated the selectivity to HR-PIB to be 79 wt %.

Stripping removed some light oligomers that had olefin isomer compositions other than contained in the actual HR-PIB polymer. Removal of the oligomer products of low Mn further had the effect of increasing the average product Mn. An Mn increase on stripping is due to removal of low Mn by-products. The concomitant increase in alpha vinylidene amount is also due to removal of by-products which, themselves are not particularly high in alpha vinylidene.

Catalyst System Examples 7-8

Calcination of Support Material and Addition of Lewis Acid/Complexing Agent to the Silica-Alumina Support Material. Silica-alumina support materials containing various ratios of $SiO_2/Al_2O_3$ were calcined at about 700° C. for a time greater than about 4 hours. Catalyst complex ($BF_3$-MeOH (1:1)) was added to the support materials to form catalyst system examples 7 and 8. $BF_3$-MeOH catalyst complexes are passed over the support material until a maximum absorption, but less than excess, is obtained as evidenced by the $BF_3$-MeOH catalyst complex exiting the tubes.

During addition of the catalyst complex to the support material, the mixture of the catalyst complex and the support material was maintained at temperatures between about 10° C. and about 60° C. with heating or cooling as required. The reaction time was about 4 hours. A tube-in-shell heat exchanger was used for the reaction with the complexing reaction taking place in the tubes and heating or cooling as required on the shell side.

TABLE 5

$BF_3$—MeOH Capacity on Silica-Alumina Support Material As a Function of Calcination Temperature

| Catalyst System Example | Silica-Alumina Support Material (wt % $Al_2O_3$) | Calcination Temperature (° C.) | $BF_3$—MeOH Capacity (wt %) |
| --- | --- | --- | --- |
| 7 | about 50 wt % $Al_2O_3$ | 700 | 65 |
| 8 | about 25 wt % $Al_2O_3$ | 700 | 72 |

Table 5 shows the $BF_3$-MeOH capacity of two silica-alumina support materials having two different ratios of $SiO_2/Al_2O_3$ with different porosities. The $SiO_2/Al_2O_3$ support material having about 75 wt % $SiO_2$ had the higher porosity and had the higher capacity for $BF_3$-MeOH complex. While not wishing to be bound by theory, it is believed that this result indicates that at least some of the $BF_3$ complex is absorbed in the pores of the substrate due to the higher pore volume of $SiO_2/Al_2O_3$ support material having about 75 wt % $SiO_2$.

Polymer Composition Example 2

Polymerization of Isobutylene to Make HR-PIB Using Catalyst System Example 7 ($BF_3$-MeOH (1:1) Catalyst Complex on $SiO_2/Al_2O_3$ Support Material Having About 50 wt % $SiO_2$). A total weight of about 45 g of high purity isobutylene (HPIB) containing greater than about 99.9 wt % isobutylene was charged to a 500 ml pressure bottle and cooled using an ice/salt bath to a temperature of about −5° C. Catalyst system example 7 (about 0.2 g) was added to the isobutylene reaction mixture with stirring. After about 20 minutes, the reaction mixture was filtered to remove the catalyst system and then heated at about 75° C. for about 2 hours to remove unreacted isobutylene. Optionally, the crude reaction mixture may be washed with water. Gravimetric analysis showed conversion (amount of isobutylene that reacted) of about 92.6%, the balance being $C_8$, $C_{12}$ and $C_{16}$ olefin oligomers and by-products. These oligomers and byproducts are removed in one or more stripping steps. Stripping removed some light oligomers that had olefin isomer compositions other than contained in the actual HR-PIB polymer. Removal of the oligomer products of low Mn further had the effect of increasing the average product Mn.

The devolatilized reaction mixture was then heated at a temperature setting of about 160° C. for about 1 hour, and then at a setting of about 225° C. for about 1 hour. The maximum internal temperature reached was about 182° C. Gravimetric analysis showed conversion (amount of isobutylene that reacted) of about 91.0%. GPC analysis showed the resulting PIB product had a Mn of about 940 daltons. $^{13}C$ NMR showed the alpha vinylidene content to be about 79.9%.

Polymer Composition Example 3

Polymerization of Isobutylene to Make HR-PIB Using Catalyst System Example 8 ($BF_3$-MeOH (1:1) Catalyst Complex on $SiO_2/Al_2O_3$ Support Material Having About 75 wt % $SiO_2$). A total weight of about 45 g of high purity isobutylene (HPIB) containing greater than about 99.9 wt % isobutylene was charged to a 500 ml pressure bottle and cooled using an ice/salt bath to a temperature of about −5° C. Catalyst system example 8 (about 0.2 g) was added to the isobutylene reaction mixture with stirring. After about 20 minutes, the reaction mixture was filtered to remove the catalyst system and then heated at about 75° C. for about 2 hours to remove unreacted isobutylene. Optionally, the crude reaction mixture may be washed with water. Gravimetric analysis showed conversion (amount of isobutylene that reacted) of about 73.2%, the balance being $C_8$, $C_{12}$ and $C_{16}$ olefin oligomers and by-products. These oligomers and byproducts are removed in one or more stripping steps. Stripping removed some light oligomers that had olefin isomer compositions other than contained in the actual HR-PIB polymer. Removal of the oligomer products of low Mn further had the effect of increasing the average product Mn.

The devolatilized reaction mixture was then heated at a temperature setting of about 160° C. for about 1 hour, and then at a setting of about 225° C. for about 1 hour. The maximum internal temperature reached was about 182° C. Gravimetric analysis showed conversion (amount of isobutylene that reacted) of about 93.1%. GPC analysis showed the resulting PIB product had a Mn of about 924 daltons. $^{13}C$ NMR showed the alpha vinylidene content to be about 81%.

By adjusting the catalyst composition, by for example increasing the ratio of complexing agent to $BF_3$, and/or slowing the polymerization reaction, the amount of alpha vinylidene content can be increased.

The examples show that solid catalyst systems for producing HR-PIB can be made by calcining support material comprising metal oxides at various temperatures and subsequently adding to the support material a mixture comprising a catalyst (e.g., $BF_3$ gas), a mixture comprising a catalyst complex (e.g., $BF_3$/complexing agent), or combinations thereof. These solid catalyst systems are dispersed in a reaction mixture to effect the polymerization of feedstocks comprising isobutylene to polyisobutylene compositions having desired olefin isomer content, in which the alpha vinylidene isomer content is greater than about 75 wt %.

The solid catalyst systems described herein show benefits over conventional liquid catalyst systems. Because the catalyst systems are solids, the catalyst systems can be removed by simple filtration, thus eliminating the need for extensive water washing and generating large amounts of waste water containing $BF_3$ salts seen with liquid catalyst systems. Catalyst washing is very cumbersome, tedious, and generates large amounts of waste water that needs disposal, usually off-site. Disposal of this waste water can be expensive and limits the plant site options. Also, the washed catalyst cannot be recovered or recycled. Moreover, because the solid catalyst systems are dispersible, a fixed bed is not required.

Solid catalyst systems comprising $BF_3$ of the present disclosure can eliminate the problem of handling toxic $BF_3$ gas at an HR-PIB production site. These solid catalyst systems can act like $BF_3$ gas in that they can be complexed further on-site, as described in by method 170, with suitable complexing agents to optimize the HR character of the PIB product, but without the hazards and dangers of handling $BF_3$ gas on site.

In addition, using solid catalyst systems comprising $BF_3$ with fast reactor technology also allows for superior processability over conventional solid heterogeneous catalytic processes, particularly in terms of lower reactor residence times. Lower reactor residence times can allow for reduced equipment sizes and lower capital costs.

As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

I claim:
1. A method of making a catalyst system comprising:
providing a support material selected from the group consisting of $Al_2O_3$, $ZrO_2$, $TiO_2$, $SnO_2$, $CeO_2$, $SiO_2$, $SiO_2/Al_2O_3$, and combinations thereof, the support material having an $Al_2O_3$ content between about 25 wt % and about 50 wt %, based on a total weight of the support material;
calcining the support material at a temperature of about 450° C. to about 900° C.; and
forming a catalyst system by adding to the support material (a) a mixture comprising $BF_3$, (b) a mixture comprising $BF_3$ and a complexing agent, or (c) both, wherein a concentration of $BF_3$ is greater than about 30 wt %, based on a total weight of the catalyst system.

2. The method of claim 1, further comprising:
contacting the catalyst system with one or more modifying agents.

3. The method of claim 1, wherein the complexing agent is an oxygen containing compound or a nitrogen containing compound.

4. The method of claim 1, wherein, the catalyst system is formed by adding to the support material a mixture comprising $BF_3$, and a concentration of $BF_3$ is greater than about 40 wt % based on a total weight of the catalyst system.

5. The method of claim 1, wherein the catalyst system is formed by adding to the support material a mixture comprising $BF_3$ and a complexing agent, and a mole ratio of the complexing agent to the $BF_3$ is between about 0.5 and about 2.

6. A catalyst system comprising:
a support material selected from the group consisting of $Al_2O_3$, $ZrO_2$, $TiO_2$, $SnO_2$, $CeO_2$, $SiO_2$, $SiO_2/Al_2O_3$, and combinations thereof, the support material having a $SiO_2$ content greater than about 45 wt %, based on a total weight of the support material; and
$BF_3$, wherein a concentration of $BF_3$ is greater than about 30 wt %, based on a total weight of the catalyst system.

7. The catalyst system of claim 6, further comprising:
a complexing agent.

8. The catalyst system of claim 7, wherein the complexing agent is an oxygen containing compound or a nitrogen containing compound.

9. The catalyst system of claim 6, wherein the concentration of $BF_3$ is greater than about 40 wt %, based on the total weight of the catalyst system.

10. The catalyst system of claim 6, wherein the support material has an $Al_2O_3$ content between about 25 wt % and about 50 wt %, based on the total weight of the support material.

11. A method of making a polymer composition, comprising:
flowing a catalyst system and a feedstock into a reactor to form a reaction mixture comprising the feedstock and the catalyst system, the feedstock comprising isobutylene, the catalyst system comprising:
a) a support material selected from the group consisting of $Al_2O_3$, $ZrO_2$, $TiO_2$, $SnO_2$, $CeO_2$, $SiO_2$, $SiO_2/Al_2O_3$, and combinations thereof; and
(b) $BF_3$, wherein a concentration of $BF_3$ is greater than about 30 wt %, based on a total weight of the catalyst system;
contacting the isobutylene with the catalyst system, wherein contacting the isobutylene with the catalyst system comprises maintaining a temperature of the reaction mixture between about −35° C. and about 100° C.; and
obtaining the polymer composition.

12. The method of claim 11, wherein the catalyst system further comprises:
a complexing agent.

13. The method of claim 11, wherein the feedstock comprises raffinate-1, or wherein the feedstock comprises greater than about 20 wt % isobutylene based on a total weight of the feedstock, or a combination thereof.

14. The method of claim 11, wherein a concentration of the catalyst system in the reaction mixture is between about 500 ppm and about 10,000 ppm based on a total weight of a catalyst feed, and wherein a $BF_3$ concentration in the reaction mixture is between about 150 ppm and about 3,000 ppm based on the total weight of the catalyst feed.

15. The method of claim 11, wherein providing the catalyst system comprises:
adding to the support material (a) $BF_3$, (b) a mixture comprising $BF_3$ and a complexing agent, or (c) a combination thereof.

16. The method of claim 11, further comprising:
discharging the polymer composition from the reactor;
feeding the polymer composition to one or more separation apparatuses selected from the group consisting of a solid-liquid separation device and a distillation column; and
discharging the polymer composition from one or more of the separation apparatuses.

17. A method of making a polymer composition, comprising:
forming a reaction mixture comprising a feedstock and a catalyst system, the feedstock comprising isobutylene, the catalyst system comprising:
a) a support material selected from the group consisting of $Al_2O_3$, $ZrO_2$, $TiO_2$, $SnO_2$, $CeO_2$, $SiO_2$, $SiO_2/Al_2O_3$, and combinations thereof; and
(b) $BF_3$, wherein a concentration of $BF_3$ is greater than about 30 wt % based on a total weight of the catalyst system;
contacting the isobutylene with the catalyst system; and
obtaining the polymer composition,
wherein the polymer composition comprises a polyisobutylene having a Mn of about 320 daltons to about 10,000 daltons, the polyisobutylene comprising a first portion comprising polymer chains having alpha vinylidene groups, and one or more of a second portion comprising polymer chains having beta vinylidene groups and a third portion comprising polymer chains having internal vinylidene groups, and wherein:
the first portion is greater than about 75 wt % based on a total weight of the polymer composition, and
a total content of the second portion plus the third portion is less than about 25 wt % based on the total weight of the polymer composition.

* * * * *